(12) United States Patent
Fontana et al.

(10) Patent No.: US 10,639,717 B2
(45) Date of Patent: May 5, 2020

(54) MAGNETOHYDRODYNAMIC FORMATION OF SUPPORT STRUCTURES FOR METAL MANUFACTURING

(71) Applicant: Desktop Metal, Inc., Burlington, MA (US)

(72) Inventors: Richard Remo Fontana, Cape Elizabeth, ME (US); Michael Andrew Gibson, Boston, MA (US)

(73) Assignee: Desktop Metal, Inc., Burlington, MA (US)

( * ) Notice: Subject to any disclaimer, the term of this patent is extended or adjusted under 35 U.S.C. 154(b) by 365 days.

(21) Appl. No.: 15/451,294

(22) Filed: Mar. 6, 2017

(65) Prior Publication Data

US 2017/0252825 A1 Sep. 7, 2017

Related U.S. Application Data

(63) Continuation of application No. PCT/US2017/020800, filed on Mar. 3, 2017.
(Continued)

(51) Int. Cl.
*B33Y 10/00* (2015.01)
*B22F 3/115* (2006.01)
(Continued)

(52) U.S. Cl.
CPC ............. *B22F 3/115* (2013.01); *B05B 5/025* (2013.01); *B22F 3/008* (2013.01); *B33Y 10/00* (2014.12);
(Continued)

(58) Field of Classification Search
CPC .................. B33Y 10/00; B33Y 30/00
See application file for complete search history.

(56) References Cited

U.S. PATENT DOCUMENTS

| 4,264,641 A | 4/1981 | Mahoney et al. |
| 4,919,335 A | 4/1990 | Hobson et al. |

(Continued)

FOREIGN PATENT DOCUMENTS

| WO | WO-2007038987 | 4/2007 |
| WO | WO-2017152133 | 9/2017 |

OTHER PUBLICATIONS

USPTO, "U.S. Appl. No. 15/451,260 Non-Final Office Action dated Aug. 28, 2018", 12 pages.
(Continued)

*Primary Examiner* — Scott R Kastler
(74) *Attorney, Agent, or Firm* — Wiggin and Dana LLP; Jonathan D. Hall; Joseph Casino

(57) ABSTRACT

Devices, systems, and methods are directed to applying magnetohydrodynamic forces to liquid metal to eject liquid metal along a controlled pattern, such as a controlled three-dimensional pattern as part of additive manufacturing of an object. Porosity of one or more predetermined portions of objects fabricated from an accumulation of liquid metal droplets ejected using magnetohydrodynamic force can be controlled to form interfaces between support structures and parts within the object. Higher porosity along the interfaces, as compared to porosity along the support structures and the parts, can be useful for facilitating separation of the parts from the support structures.

15 Claims, 21 Drawing Sheets

Related U.S. Application Data

(60) Provisional application No. 62/303,341, filed on Mar. 3, 2016.

(51) Int. Cl.
  *B22F 3/00* (2006.01)
  *B33Y 30/00* (2015.01)
  *B33Y 50/02* (2015.01)
  *B05B 5/025* (2006.01)

(52) U.S. Cl.
  CPC ............... *B33Y 30/00* (2014.12); *B33Y 50/02* (2014.12); *B22F 2999/00* (2013.01)

(56) References Cited

U.S. PATENT DOCUMENTS

| | | | |
|---|---|---|---|
| 5,171,360 A | 12/1992 | Orme et al. | |
| 5,176,874 A | 1/1993 | Mourer et al. | |
| 5,201,359 A | 4/1993 | McMulen et al. | |
| 5,261,611 A | 11/1993 | Huxford et al. | |
| 5,266,098 A | 11/1993 | Chun et al. | |
| 5,377,961 A | 1/1995 | Smith et al. | |
| 5,669,433 A | 9/1997 | Sterett et al. | |
| 5,779,971 A | 7/1998 | Tsung Pan et al. | |
| 5,876,615 A | 3/1999 | Predetechensky et al. | |
| 6,202,734 B1 | 3/2001 | Sackinger et al. | |
| 6,350,494 B1 | 2/2002 | Farnworth | |
| 6,446,878 B1 | 9/2002 | Chandra et al. | |
| 7,700,016 B2 | 4/2010 | Winey, III et al. | |
| 8,721,032 B2 | 5/2014 | Kuznetsov et al. | |
| 8,757,511 B2 | 6/2014 | Ciardella et al. | |
| 9,198,299 B2 | 11/2015 | Ulmer et al. | |
| 9,868,254 B2 | 1/2018 | Stahl et al. | |
| 2011/0233239 A1 | 9/2011 | Rasa et al. | |
| 2014/0322451 A1 | 10/2014 | Barton et al. | |
| 2015/0140151 A1 | 5/2015 | Schmehl et al. | |
| 2015/0273577 A1 | 10/2015 | Vader et al. | |
| 2016/0136887 A1 | 5/2016 | Guillemette et al. | |
| 2016/0361763 A1 | 12/2016 | Batchelder et al. | |
| 2017/0087632 A1 | 3/2017 | Mark | |
| 2017/0182553 A1 | 6/2017 | Vader et al. | |
| 2017/0252821 A1 | 9/2017 | Sachs et al. | |
| 2017/0252822 A1 | 9/2017 | Sachs et al. | |
| 2017/0252823 A1 | 9/2017 | Sachs et al. | |
| 2017/0252824 A1 | 9/2017 | Gibson et al. | |
| 2017/0252825 A1* | 9/2017 | Fontana | B05B 5/025 |
| 2017/0252826 A1 | 9/2017 | Sachs et al. | |
| 2017/0252827 A1 | 9/2017 | Sachs et al. | |
| 2017/0252828 A1 | 9/2017 | Sachs et al. | |
| 2017/0252829 A1 | 9/2017 | Sachs et al. | |
| 2017/0252830 A1 | 9/2017 | Sachs et al. | |

OTHER PUBLICATIONS

USPTO, "U.S. Appl. No. 15/451,270 Non-Final Office Action dated Aug. 15, 2018", 9 pages.

WIPO, "PCT Application No. PCT/US17/20800 International Preliminary Report on Patentability dated Sep. 13, 2018", 12 pages.

ISA, "PCT Application No. PCT/US17/20800 International Search Report and Written Opinion dated Jul. 17, 2017", 17 pages.

* cited by examiner

US 10,639,717 B2

MAGNETOHYDRODYNAMIC FORMATION OF SUPPORT STRUCTURES FOR METAL MANUFACTURING

CROSS-REFERENCE TO RELATED APPLICATIONS

This application is a continuation filed under 35 U.S.C. § 111(a) that claims priority under 35 U.S.C. § 120 and § 365(c) to International Application No. PCT/US17/20800, filed on Mar. 3, 2017, which claims the benefit under 35 § 119(e) of U.S. Prov. App. No. 62/303,341, filed on Mar. 3, 2016, with the entire contents of each of these applications hereby incorporated herein by reference.

FIELD

The devices, systems and methods described herein relate to manufacturing, and more specifically to a magnetohydrodynamic (MHD) system for manufacturing with metallic materials.

BACKGROUND

An electric current can be combined with a magnetic field to impart MHD forces on a liquid metal. Such forces can propel the liquid metal to form a metallic object. While MHD forces can be used to form a metallic object, considerations related to speed, accuracy, control, and material properties present challenges for the use of MHD forces for object formation on a large scale. Accordingly, there remains a need for commercially viable techniques for metal manufacturing using MHD forces.

SUMMARY

Devices, systems, and methods are directed to applying magnetohydrodynamic forces to liquid metal to eject liquid metal along a controlled pattern, such as a controlled three-dimensional pattern as part of additive manufacturing of an object. Porosity of one or more predetermined portions of objects fabricated from an accumulation of liquid metal droplets ejected using magnetohydrodynamic force can be controlled to form interfaces between support structures and parts within the object. Higher porosity along the interfaces, as compared to porosity along the support structures and the parts, can be useful for facilitating separation of the parts from the support structures.

In one aspect, a method of additive manufacturing disclosed herein includes providing a liquid metal in a fluid chamber at least partially defined by a housing, the fluid chamber having an inlet region and a discharge region; directing a magnetic field through the housing; moving the discharge region in a controlled three-dimensional pattern; and delivering electric current between electrodes at least partially defining a firing chamber within the fluid chamber between the inlet region and the discharge region, the electric current intersecting the magnetic field in the liquid metal in the firing chamber to eject the liquid metal from the discharge region; and based on the position of the discharge region along the controlled three-dimensional pattern, controlling porosity of one or more predetermined portions of an accumulation of the ejected liquid metal on a build plate or on a previously deposited layer of metal.

Controlling porosity of the one or more predetermined portions of the accumulation of the ejected liquid metal may include forming an interface between a support structure and a three-dimensional object in the accumulation, the support structure and the three-dimensional object having lower porosity than the interface. The interface, the support structure and the three-dimensional object may be formed of the same material. The interface may be frangible relative to the three-dimensional object. The method may include separating the three-dimensional object from the support structure through application of one or more of a compressive force and a shear force to the interface. Controlling porosity of the one or more predetermined portions of the accumulation of the ejected liquid metal may include changing velocity of the liquid metal ejected from the discharge region. Changing the velocity of the liquid metal ejected from the discharge region may include changing a magnitude of the electric current delivered into the liquid metal in the firing chamber. Delivering electric current into the liquid metal in the firing chamber may include pulsing the electric current. Changing the velocity of the liquid metal ejected from the discharge region may include changing at least one of a magnitude and a duration of a pulse of the electric current. Controlling porosity of the one or more predetermined portions of the accumulation of the ejected liquid metal may include changing temperature of the liquid metal ejected from the discharge region. Changing the temperature of the liquid metal ejected from the discharge region may include reducing the temperature of the ejected liquid metal to increase porosity of a predetermined portion of the accumulation of the ejected liquid metal on the build plate or on the previously deposited layer of metal.

In another aspect, a computer program product disclosed herein includes non-transitory computer executable code embodied in a non-transitory computer readable medium that, when executing on one or more processors, performs the steps of: moving a discharge region of a housing in a controlled three-dimensional pattern; delivering electric current into a liquid metal in a firing chamber at least partially defined by electrodes, the delivered electric current intersecting a magnetic field in the liquid metal in the firing chamber to eject the liquid metal from the discharge region in fluid communication with the firing chamber; and based on the position of the discharge region along the controlled three-dimensional pattern, controlling porosity of one or more predetermined portions of an accumulation of the ejected liquid metal on a substrate or on a previously deposited layer of metal.

Controlling porosity of the one or more predetermined portions of the accumulation of the ejected liquid metal may include changing velocity of the liquid metal ejected from the discharge region. Changing the velocity of the liquid metal ejected from the discharge region may include changing a magnitude of the electric current. Delivering electric current into the liquid metal in the firing chamber may include pulsing the electric current. Changing the velocity of the liquid metal ejected from the discharge region may include changing at least one of a magnitude and a duration of the pulse of the electric current. Controlling porosity of the one or more predetermined portions of the accumulation of the ejected liquid metal may include changing temperature of the liquid metal ejected from the discharge region. Changing the temperature of the liquid metal ejected from the discharge region may include reducing the temperature of the ejected liquid metal to increase porosity of a predetermined portion of the accumulation of the ejected liquid metal on the substrate or on the previously deposited layer of metal.

BRIEF DESCRIPTION OF THE DRAWINGS

The systems and methods described herein are set forth in the appended claims. However, for the purpose of explanation, several implementations are set forth in the following drawings:

DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

As used herein, the term "liquid metal" shall be understood to include metals and metal alloys in liquid form and, additionally or alternatively, includes any fluid containing metals and metal alloys in liquid form, unless otherwise specified or made clear by the context.

Figure 1:
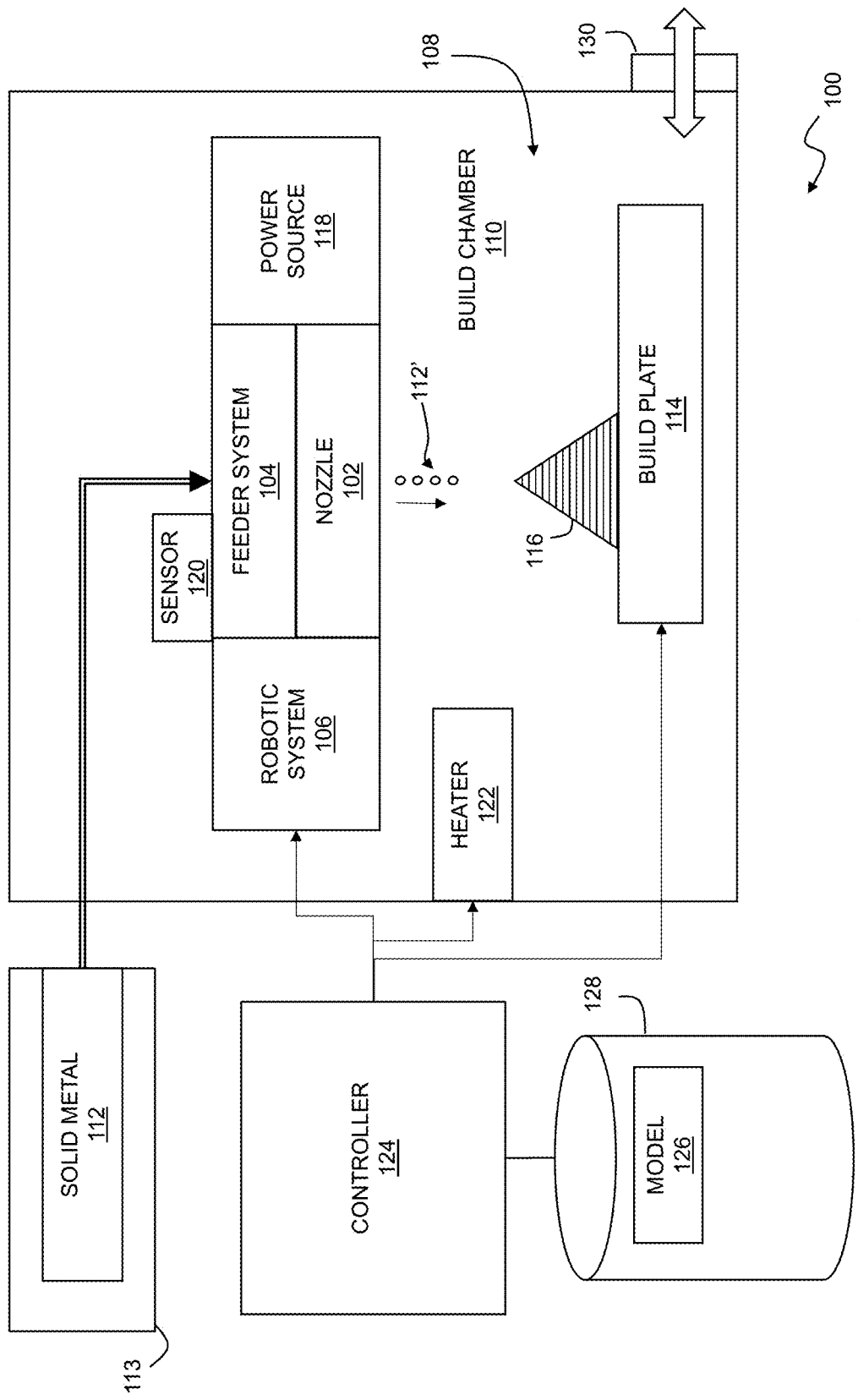
FIG. 1 is a block diagram of a three-dimensional printer for use with MHD deposition of metal for manufacturing.
Figure 2A:
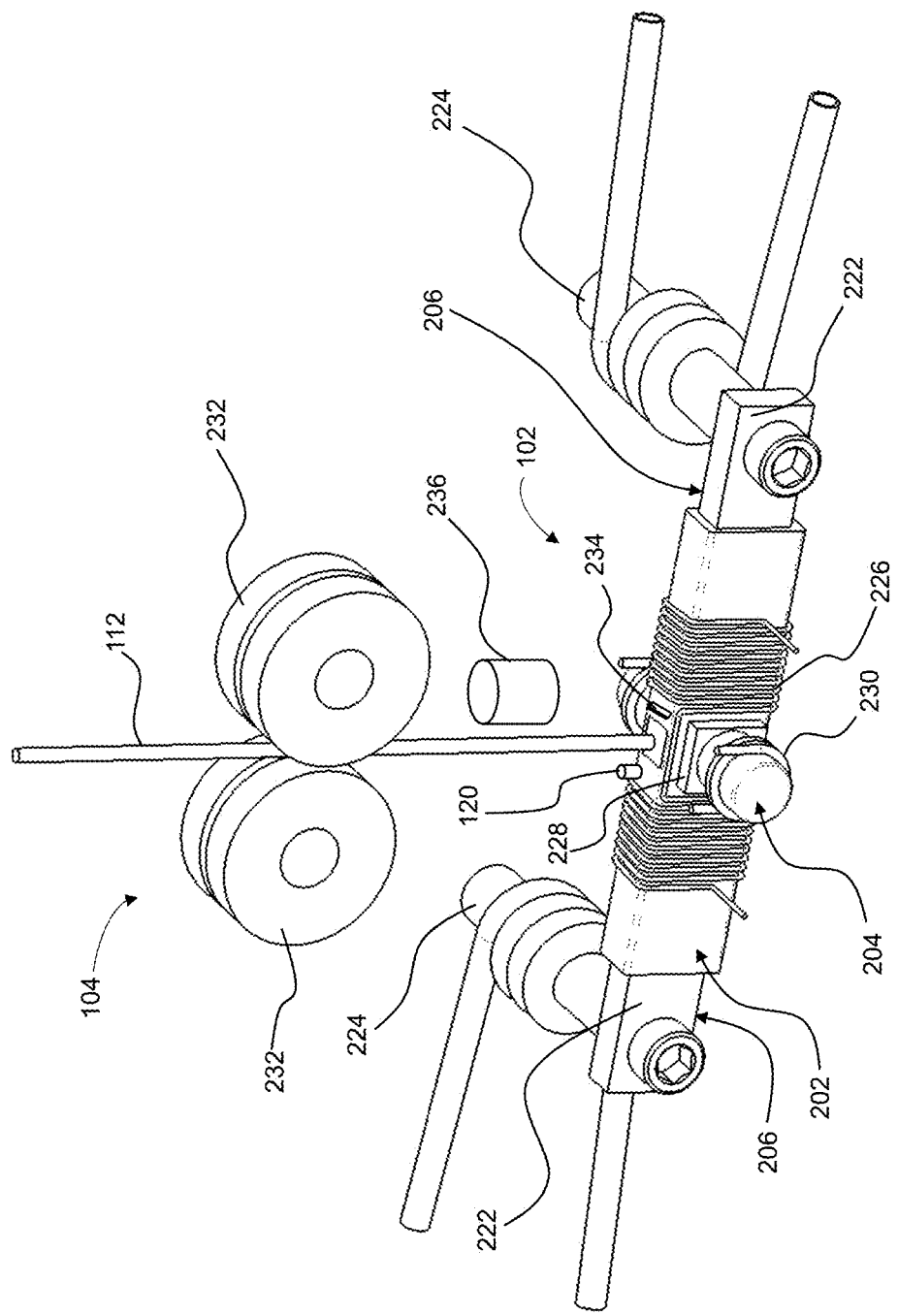
FIG. 2A is an isometric view of a feeder system and a nozzle of the three-dimensional printer of FIG. 1.
Figure 2B:
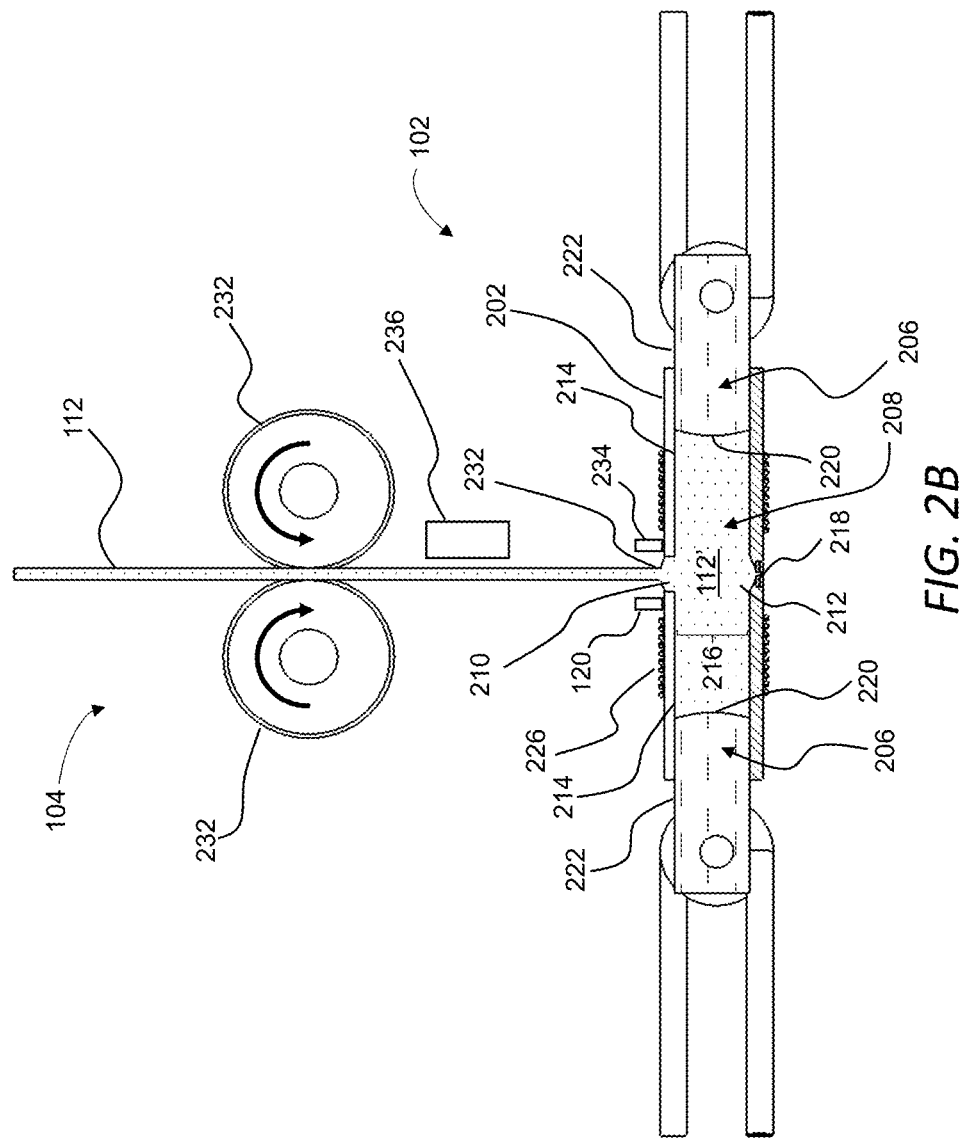
FIG. 2B is a cross-sectional side view of a cross-section of the feeder system and the nozzle of FIG. 2A.
Figure 2C:
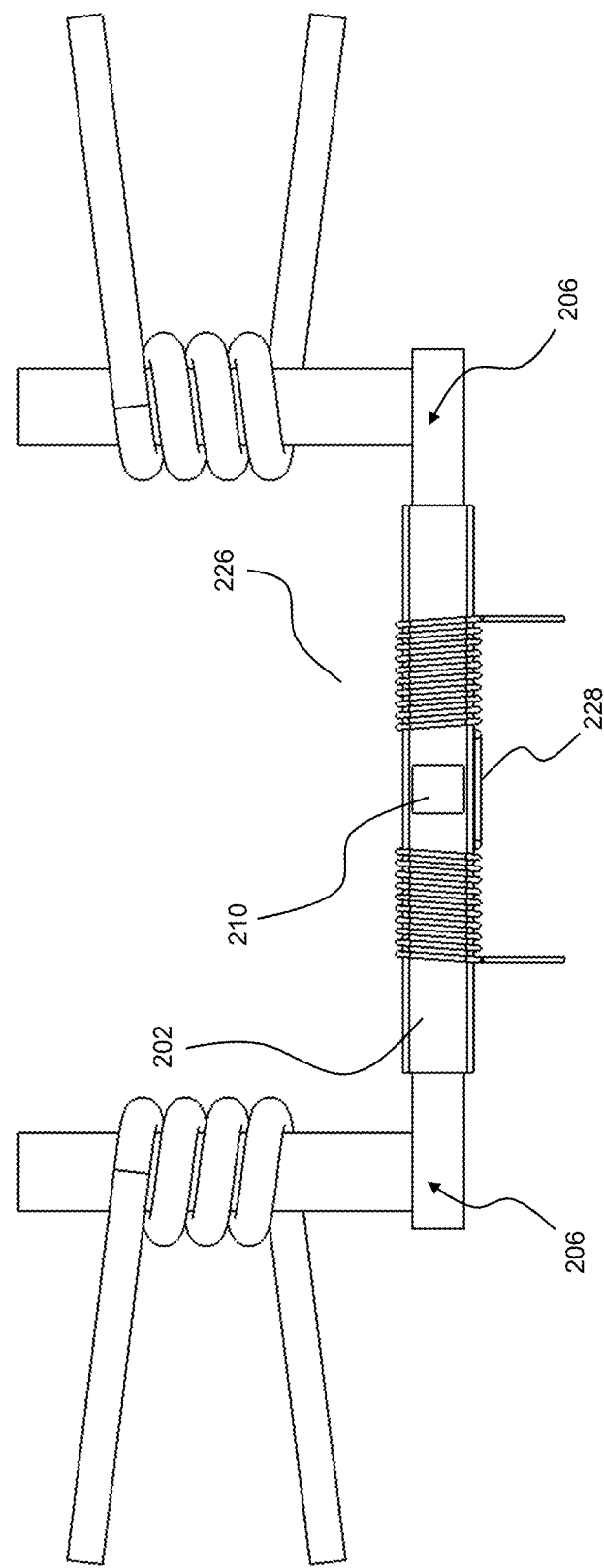
FIG. 2C is a top view of the nozzle of FIG. 2A.
Figure 2D:
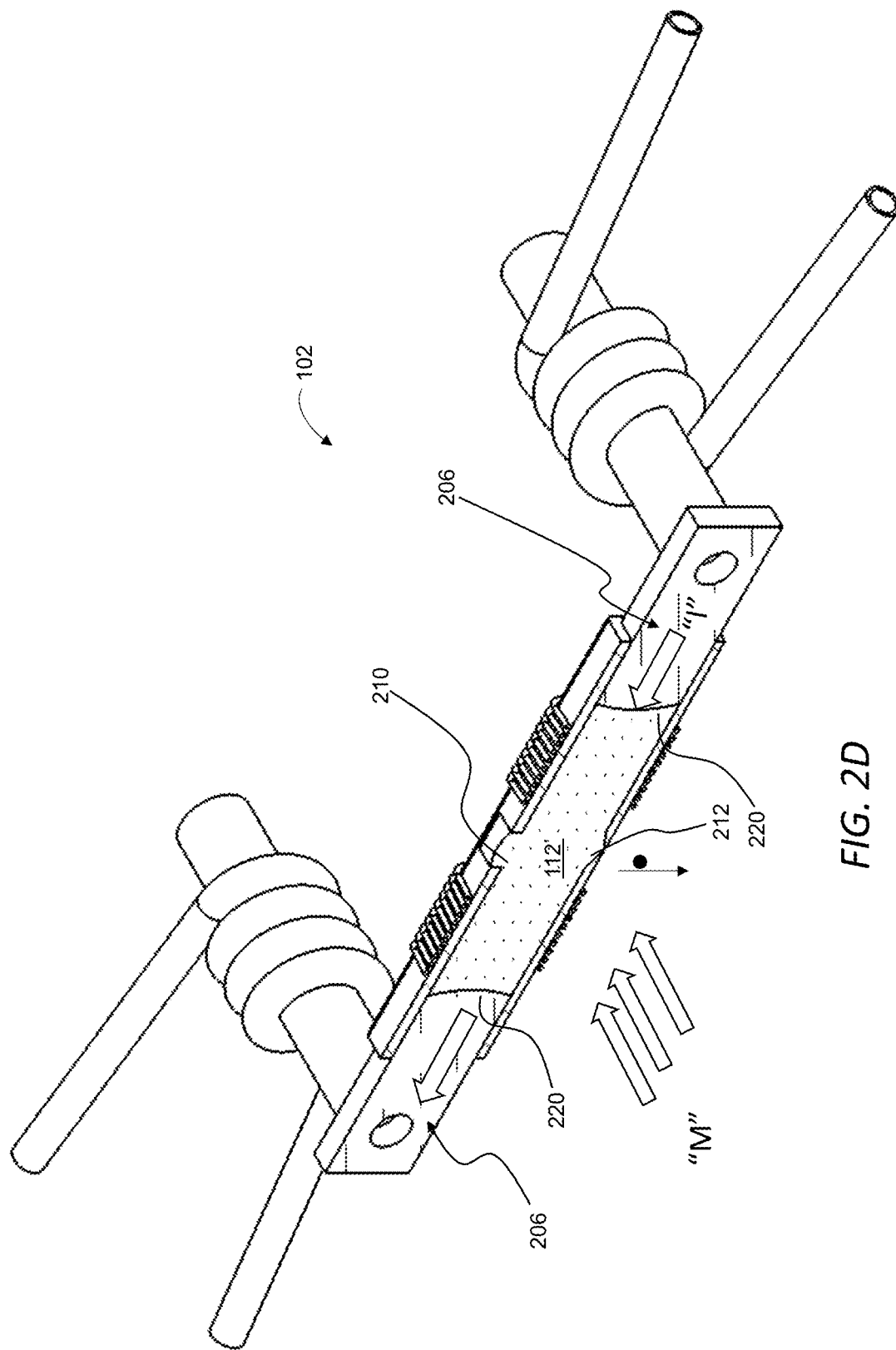
FIG. 2D is schematic representation generation of MHD force in liquid metal in the nozzle of FIG. 2A.

Referring now to FIGS. 1-2D, a three-dimensional printer 100 can include a nozzle 102, a feeder system 104, and a robotic system 106. In general, the robotic system 106 can move the nozzle 102 along a controlled pattern within a working volume 108 of a build chamber 110 as the feeder system 104 moves a solid metal 112 from a metal supply 113 and into the nozzle 102. As described in greater detail below, the solid metal 112 can be melted in or adjacent to the nozzle 102 to form a liquid metal 112' and, through a combination of a magnetic field and an electric current acting on the liquid metal 112' in the nozzle 102, magnetohydrodynamic (MHD) forces can eject the liquid metal 112' from the nozzle 102 in a direction toward a build plate 114 disposed within the build chamber 110. Through repeated ejection of the liquid metal 112' as the nozzle 102 moves along the controlled pattern, an object 116 (e.g., a two-dimensional object or a three-dimensional object) can be formed. Alternatively, or additionally, the object 116 can be moved under the nozzle 102 (e.g., as the nozzle 102 remains stationary). For example, in instances in which the controlled pattern is a three-dimensional pattern, the liquid metal 112' can be ejected from the nozzle 102 in successive layers to form the object 116 through additive manufacturing. Thus, in general, the feeder system 104 can continuously, or substantially continuously, provide build material to the nozzle 102 as the nozzle 102 ejects the liquid metal 112', which can facilitate the use of the three-dimensional printer 100 in a variety of manufacturing applications, including high volume manufacturing of metal parts. As also described in greater detail below, MHD forces can be controlled in the nozzle 102 to provide drop-on-demand delivery of the liquid metal 112' at rates ranging from about one liquid metal drop per hour to thousands of liquid metal drops per second and, in certain instances, to deliver a substantially continuous stream of the liquid metal 112'. Such a wide range of control over droplet flow rate can, additionally or alternatively, facilitate achieving accuracy and speed targets associated with commercially viable three-dimensional fabrication.

In general, the liquid metal 112' can be any one or more of the various different metals. For example, the liquid metal 112' can include a metal offering some resistance to oxidation, which can facilitate operating the nozzle 102 in an imperfectly controlled environment within the build chamber 110. Thus, for example, the liquid metal 112' can include aluminum or an aluminum alloy. In particular, the liquid metal 112' can include an aluminum casting alloy such as any one or more of those known in the art and modifications thereof. Additionally, or alternatively, the liquid metal 112' can include one or more alloys not normally used for castings may because, even though solidification may take place in such alloys, the grain size of the metal deposited on the object 116 will be controlled by the size of the droplet ejected from the nozzle 102. Additional or alternative examples of metals that can form the liquid metal 112' include one or more of carbon steels, tools steels, stainless steels, and tin alloys (e.g., solder).

Referring now to FIGS. 1 and 2A-2D, the nozzle can include a housing 202, one or more magnets 204, and electrodes 206. The housing 202 can define at least a portion of a fluid chamber 208 having an inlet region 210, a discharge region 212, and recesses 214. The one or more magnets 204 can be supported on the housing 202 or otherwise in a fixed position relative to the housing 202 with a magnetic field "M" generated by the one or more magnets 204 directed through the housing 202. In particular, the magnetic field can be directed through the housing 202 in a direction intersecting the liquid metal 112' as the liquid metal 112' moves from the inlet region 210 to the discharge region 212. Also, or instead, the electrodes 206 can be supported on the housing 202 to define at least a portion of a firing chamber 216 within the fluid chamber 208, between the inlet region 210 and the discharge region 212. In use, as described in greater detail below, the feeder system 104 can engage the solid metal 112 and, additionally or alternatively, can direct the solid metal 112 into the inlet region 210 of the fluid chamber 208 as the liquid metal 112' is ejected from the discharge region 212 through MHD forces generated using the one or more magnets 204 and the electrodes 206.

In certain implementations, an electric power source 118 can be in electrical communication with the electrodes 206 and can be controlled to produce an electric current "I" flowing between the electrodes 206. In particular, the electric current "I" can intersect the magnetic field "M" in the liquid metal 112' in the firing chamber 216. It should be understood that the result of this intersection is an MHD force (also known as a Lorentz force) on the liquid metal 112' at the intersection of the magnetic field "M" and the electric current "I". Because the direction of the MHD force obeys the right-hand rule, the one or more magnets 204 and the electrodes 206 can be oriented relative to one another to exert the MHD force on the liquid metal 112' in a predictable direction, such as a direction that can move the liquid metal 112' toward the discharge region 212. The MHD force on the liquid metal 112' is of the type known as a body force, as it acts in a distributed manner on the liquid metal 112' wherever both the electric current "I" is flowing and the magnetic field "M" is present. The aggregation of this body force creates a pressure which can lead to ejection of the liquid metal 112'. It should be appreciated that orienting the magnetic field "M" and the electric current substantially perpendicular to one another and substantially perpendicular to a direction of travel of the liquid metal 112' from the inlet region 210 to the discharge region 212 can result in the most efficient use of the electric current "I" to eject the liquid metal 112' through the use of MHD force.

In use, the electrical power source 118 can be controlled to pulse the electric current "I" flowing between the electrodes 206. The pulsation can produce a corresponding pulsation in the MHD force applied to the liquid metal 112' in the firing chamber 216. If the impulse of the pulsation is sufficient, the pulsation of the MHD force on the liquid metal 112' in the firing chamber 208 can eject a corresponding droplet from the discharge region 212. Accordingly, drop-on-demand delivery of droplets of the liquid metal 112' can be achieved by controlling a frequency of pulsation of the electric current "I". For example, high placement accuracy is desirable as the outer perimeter of each layer of a part is printed. In regions where this perimeter is a straight line or a curved line of low curvature, the motion system will be able to traverse rapidly and therefore the printhead will be fired at a high frequency. In some cases, the speed of the motion system will be restricted by the maximum frequency of drop ejection possible. This maximum frequency will depend on the design of the printhead, the size of the desired droplet and other factors and may vary between 1 and 20 kiloHertz. However, as regions of the perimeter of high curvature are traversed, the acceleration requirements may dictate that these regions be traversed at lower speed and therefore that the printhead be fired at a lower frequency. This is especially true for sharp corners where the motion mechanism may instantaneously come to a stop and the printhead may similarly stop firing instantaneously.

In certain implementations, the pulsed electric current "I" can be driven in a manner to control the shape of a droplet of the liquid metal 112' exiting the nozzle 102. In particular, because the electric current "I" interacts with the magnetic field "M" according to the right-hand rule, a change in direction (polarity) of the electric current "I" across the firing chamber 216 can change the direction of the MHD force on the liquid metal 112' along an axis extending between the inlet region 210 and the discharge region 212. Thus, for example, by reversing the polarity of the electric current "I" relative to the polarity associated with ejection of the liquid metal 112', the electric current "I" can exert a pullback force on the liquid metal 112' in the fluid chamber 208.

Each pulse can be shaped with a pre-charge that applies a small, pullback force (opposite the direction of ejection of the liquid metal 112' from the discharge region 212) before creating an ejection drive signal to propel one or more droplets of the liquid metal 112' from the nozzle 102. In response to this pre-charge, the liquid metal 112' can be drawn up slightly with respect to the discharge region 212. Drawing the liquid metal 112' slightly up toward the discharge orifice in this way can provide numerous advantageous, including providing a path in which a bolus of the liquid metal 112' can accelerate for cleaner separation from the discharge orifice as the bolus of the liquid metal is expelled from the discharge orifice, resulting in a droplet with a more well-behaved (e.g., stable) shape during travel.

Similarly, the retracting motion can effectively spring load a forward surface of the liquid metal 112' by drawing against surface tension of the liquid metal 112' along the discharge region 212. As the liquid metal 112' is then subjected to an MHD force to eject the liquid metal 112', the forces of surface tension can help to accelerate the liquid metal 112' toward ejection from the discharge region 212.

Further, or instead, each pulse can be shaped to have a small pullback force following the end of the pulse. In such instances, because the pullback force is opposite a direction of travel of the liquid metal 112' being ejected from the discharge region 212, the small pullback force following the end of the pulse can facilitate clean separation of the liquid metal 112' along the discharge region 212 from an exiting droplet of the liquid metal 112'. Thus, in some implementations, the drive signal produced by the electrical power source 118 can include a wavelet with a pullback signal to pre-charge the liquid metal 112', an ejection signal to expel a droplet of the liquid metal, and a pullback signal to separate an exiting droplet of the liquid metal 112' from the liquid metal 112' along the discharge region 212. Additionally, or alternatively, the drive signal produced by the electrical power source 118 can include one or more dwells between portions of each pulse.

While pulsing the electric current "I" at high frequencies can be useful for achieving speed targets associated with viable three-dimensional printing, it should be understood that resonance frequency of the liquid metal 112' in the fluid chamber 208 can limit the upper frequency associated with pulsing the electric current "I" to eject droplets of the liquid metal 112'. For example, maintaining the rate of pulsation of the electric current "I" (and the associated rate of pulsation of the MHD force) at a rate less than a rate associated with a resonant frequency of the liquid metal 112' in the fluid chamber 208 can reduce the likelihood of inadvertently producing droplet velocities that are too high or too low, drop volumes that are too high or too low, ejection of multiple drops instead of single drops, and satellite drops. Thus, in general, the electric current "I" can be pulsed at a frequency varying based on the position and/or speed of the discharge region 212 along the controlled pattern and conducted into the liquid metal 112' in the firing chamber 208, with an upper limit of the frequency being less than a resonant frequency of the liquid metal 112' in the fluid chamber 208. As described in greater detail below, the nozzle 20 can include one or more features directed toward achieving a high resonant frequency of the liquid metal 112' in the fluid chamber 208 to facilitate accurate control of liquid metal droplet delivery at high injection rates.

Given that the resonance frequency of the liquid metal 112' in the fluid chamber 208 is a function of the overall axial length (e.g., an axial length from the inlet region 210 to the discharge region 212) of the fluid chamber 208, several features of the nozzle 102 can be directed toward producing MHD forces in a short overall axial length (to support ejection of the liquid metal 112' in the fluid chamber 208 at high frequencies) while remaining low enough to avoid excessive Joule heating in the liquid metal 112' during pulsation of the electric current "I". That is, because the overall axial length of the fluid chamber 208 is limited by considerations related to resonance frequency, it is desirable to make efficient use of the available axial length of the fluid chamber 208 to deliver the electric current "I" required to produce MHD forces corresponding to appropriate droplet rates, sizes, and velocities.

In some implementations, the overall axial length of the fluid chamber 208 can be greater than about 2 mm and less than about 2 cm to produce a resonance frequency high enough (e.g., about 20 kHz) to support a high frequency ejection rate (e.g., a frequency of up to about 5 kHz at a maximum speed of movement of the discharge orifice 218 along the controlled pattern). In some instances, it can be desirable to increase the resonant frequency of the nozzle 102 to be substantially above a maximum jetting frequency of the liquid metal 112' (e.g., about 5 times higher, 10 times higher, or more). In such instances, any excitation of a resonant frequency will have many oscillations to damp out. This can be advantageous because the viscosity of the liquid metal 112' is low (e.g., in the range of 1-5 centipoise) and is typically constant. To make efficient use of the axial length available for creating MHD forces in the liquid metal 112' in the fluid chamber 208, the electrodes 206 can be positioned such that the electric current "I" conducted from the electrodes 206 into the firing chamber 216 intersects the magnetic field "M" in the firing chamber 216 at a point substantially adjacent to a discharge orifice 218 of the discharge region 212. As a specific example of introducing the electric current "I" substantially adjacent to the discharge orifice 218, a volume of the fluid chamber 208 between the firing chamber 216 and the discharge orifice 218 can be less than about ten percent of a total volume of the fluid chamber 208. Additionally, or alternatively, an axial length of the firing chamber 216 at least partially defined by the electrodes 206 can be more than half of the axial length of the fluid chamber 208 from the inlet region 210 to the discharge region 212. In some instances, the sum of the length of the inlet region 210 and the discharge region 218 can be less than about 20 percent of the total length of the fluid chamber 208.

A particular challenge associated with the use of the electrodes 206 to conduct the electric current "I" into the liquid metal 112' can be the selection of an appropriate material that can be used in combination with the liquid metal 112'. In general, it is desirable to select the material of the electrodes 206 such that the electrodes 206 can operate reliably over long periods of time in the presence of the liquid metal 112', which may require high temperatures to remain in the molten state. Accordingly, the material of the electrodes 206 can have a melt temperature equal to or greater than a melt temperature of the liquid metal 112' in contact with the electrodes 206 such that the electrodes 206 will not be consumed during operation of the nozzle 102 and reduce the likelihood of contamination of the object 116 being formed. Additionally, or alternatively, the material of the electrodes 206 can be substantially unreactive with the liquid metal 112' (e.g., the material can be inert with respect to the liquid metal 112' or form a passivation layer in the presence of the liquid metal 112') to reduce, for example, the likelihood of degraded performance of material over time. Further or instead, the material of the electrodes can have an electrical resistivity substantially similar to the electrical resistivity of the liquid metal 112' to facilitate accurate direction of the electric current "I" and, thus, accurate direction of the liquid metal 112' ejected from the discharge region 212. Thus, as a specific example, the electrodes can be formed of one or more of tantalum and niobium in instances in which the liquid metal 112' is aluminum or an aluminum alloy.

In some implementations, the electrodes 206 can be formed of the same material as the liquid metal 112' at the respective interface between each of the electrodes 206 and the liquid metal 112'. It should be appreciated that such implementations can represent an advantageous solution to the issue of material selection, particularly as the issue of material selection relates to materials having one or more of a melt temperature, a reactivity, and an electrical resistivity that are difficult to match using economically available materials of a different composition. As a specific example, forming the electrodes 206 of the same material as the liquid metal 112' can facilitate the use of steel as the liquid metal 112'.

In implementations in which the electrodes 206 and the liquid metal 112' are formed of the same material, the respective electrode 206 is molten at an interface 220 between the respective electrode 206 and the liquid metal 112'. Further, the interfaces 220 can move in response to, among other things, temperature fluctuations that can occur during normal operation of the nozzle 102. Accordingly, to facilitate robust operation of the nozzle 102, the position of the interface 220 can be controlled to within a predetermined region within the fluid chamber 208. For example, a maximum radial dimension of the firing chamber 216 can be wider than a maximum radial dimension of the fluid chamber 208 adjacent to the firing chamber 216 (e.g., wider than the inlet region 210, the discharge region 212, or both). Continuing with this example, each interface 220 can be controlled to be along a portion of the respective recess 214 away from the general flow path of the liquid metal 112' moving from the inlet region 210 to the discharge region 212.

In certain instances, controlling the position of each interface 220 can include cooling a portion 222 of each electrode 206 away from the respective interface 220. In general, it should be appreciated that the resulting temperature gradient in the electrode 206 can move the interface 220 in a direction away from the flow path of the liquid metal 112' as the liquid metal 112' is ejected from the discharge region 212. Accordingly, to facilitate controlling the position of the interface 218, the nozzle 102 can include a heat sink 224 coupled to the portion 222 of each electrode 206. As an example, the heat sink 224 can cool the portion 222 of each electrode 206 through forced convection, which can optionally be controlled (e.g., based at least in part on a rate of ejection of the liquid metal 112' from the discharge region 212) to achieve a target temperature. As a more specific example, the heat sink 224 can include a fluid (e.g., water) movable away from the portion 222 of each electrode 206 to cool the electrode 206. Additionally, or alternatively, in implementations in which the portion 222 of each electrode 206 extends outside of the housing 202 in a direction away from the firing chamber 216, the heat sink 224 can include a fan operable to move air over the portion 220 of each electrode 206. While each electrode 206 is shown as thermally coupled to a respective one of the heat sinks 224, it should be appreciated that the electrodes 206 can be alternatively coupled to a single heat sink.

In general, the direction of travel of the electric current "I" across the firing chamber can impact the direction of the MHD force exerted on the liquid metal 112' and, thus, can influence accuracy of droplet delivery. While forming the electrodes 206 and the liquid metal 112' of the same material or otherwise matching the resistivity of the electrodes 206 and the liquid metal 112' can reduce the likelihood of inadvertent misdirection of the electric current "I" resulting from mismatches in resistivity of the material of the electrodes 206 and the liquid metal 112', it should be appreciated that some degree of mismatch in resistivity can nevertheless be present during use (e.g., through slight differences in materials). Accordingly, to reduce the likelihood of inadvertent misdirection of the electric current "I" across the firing chamber 208, the firing chamber 208 can be defined to have a substantially rectangular cross-section in a plane perpendicular to a direction of travel of the liquid metal 112' from the inlet region 210 toward the discharge region 212. Because a substantially rectangular cross-section does not have a maximum dimension, it should be appreciated that the electric current "I" is more likely to be evenly distributed along the substantially rectangular cross-section, as compared to a non-rectangular cross-section (e.g., a circular cross-section) having a maximum dimension along which a preferred current path can form.

The housing 202 can be formed of a material that is thermally, chemically, and electrically compatible with supporting the electrodes 206 and the liquid metal 112' for application of the electric current "I" to the liquid metal 112' to create MHD forces as necessary to build the object 116. More specifically, in instances in which the electric current "I" is directed into the liquid metal 112' through the interface 220 of molten material between the electrodes 206 and the liquid metal 112', the material of the housing 202 can have a higher melting temperature than the material of the electrodes 206 and the liquid metal 112' to support the interface 218 between the electrodes 206 and the liquid metal 112'. For example, the housing 202 can be formed of a material that can support liquid metals having a melt temperature greater than about 550° C. and less than about 1500° C. As a more specific example, the housing 202 can be formed of a ceramic material, which can withstand high temperatures associated with a molten state of certain metals (e.g., steel). Examples of such ceramic materials include, but are not limited to one or more of alumina, sapphire, ruby, aluminum nitride, aluminum carbide, silicon nitride, sialons, and boron carbide. Additionally, or alternatively, the housing 202 can be formed of more than one material, which can be useful for reducing the use of more expensive materials along portions of the housing 202 where the properties of the more expensive material may be less critical and a less expensive material can provide adequate performance.

A heater 226 can be supported along the housing 202 and, further or instead, can be in thermal communication with the liquid metal 112' in the fluid chamber 208 to heat the liquid metal 112' in the fluid chamber 208. Additionally, or alternatively, the heater 226 can heat the solid metal 112 as the solid metal 112 is moved through the inlet region 210 and into the fluid chamber 208. The heater 226 can, for example, include a resistive heating circuit including a resistance wire (e.g., one or more of nichrome and Kanthal®, a ferritic iron-chromium-aluminum alloy available from Sandvik AB of Hallstahammar, Sweden). In implementations in which the housing 202 is formed of a ceramic material, for example, the resistance wire can be wrapped directly around the housing 202. Additionally, or alternatively, the resistance wire can be embedded at least a portion of the housing 202 to heat the fluid chamber 208. In certain instances, the heater 226 can include one or more cartridge heaters inserted into the housing. Cartridge heaters contain resistance heating elements packaged, typically into a tubular container. Further, or instead, the heater 226 can include an induction heating circuit including an induction coil wrapped around the housing 202. Other types of heaters can be further or instead used to deliver heat to the fluid chamber include, but are not limited to radiation heaters, convection heaters, and combinations thereof.

It should be understood that the heating requirements associated with jetting droplets of the liquid metal 112' can depend on the composition of the liquid metal 112'. In certain implementations, the metal can be in liquid form at room temperature, such that MHD forces can be applied to the liquid metal 112' without the use of the heater 122. In some implementations, such as in the case of aluminum or aluminum alloys, the housing 202 can be heated to a temperature of greater than about 600° C. (e.g., about 650° C.) such that aluminum or aluminum alloy is in liquid form in the fluid chamber 208. Additionally, or alternatively, in certain implementations, such as in the case of steel, the housing 202 can be heated to greater than about 1550° C. such that steel is in liquid form in the fluid chamber 208.

The one or more magnets 204 can include fixed magnets. For example, the one or more magnets 204 can include rare earth magnets or any other magnet or group of magnets capable of generating an adequate magnetic field across the firing chamber 216. In some implementations, the one or more magnets 204 can also, or instead, include an electromagnet. Increasing the magnetic field present within the liquid metal 112' can reduce the requirements on one or more of the magnitude and duration of the current pulse and is, therefore, desirable. Hallbach arrays of permanent magnets can be used, in some implementations, to increase the strength of the field.

The one or more magnets 204 can be sized and arranged such that the magnetic field "M" produced by the one or more magnets 204 spans substantially the entire fluid chamber 208. In instances in which electrodes, such as the electrodes 206 are formed of the same material as the liquid metal being jetted, such as the liquid metal 112', the magnetic field "M" can be established along the entire length of a molten portion, such as the interfaces 220, to reduce the likelihood of fluid eddy currents. In this way, the likelihood of forming fluid eddy currents in the liquid metal 112' can be decreased relative to the likelihood of forming fluid eddy currents with magnetic fields that span less of the fluid chamber 208.

A challenge associated with producing adequate MHD forces in the liquid metal 112' in the firing chamber 208 can be the thermal management of the one or more magnets 204 in applications in which the liquid metal 112' has a melting temperature above a temperature associated with degradation of the magnetic properties of the one or more magnets 204 (e.g., a temperature of greater than about 150° C.). Specifically, the magnetic field strength of many magnets decreases rapidly with distance away from the magnet. Accordingly, to produce a sufficiently strong magnetic field in the firing chamber 208, it can be desirable to place the one or more magnets 204 in relatively close proximity to the fluid chamber 208 (e.g., within about 2 mm of the fluid chamber 208). However, in those instances in which the heater 226 is heating the firing chamber 208 above a temperature associated with degraded magnetic field strength of the one or more magnets 204. Such a temperature can correspond, for example, to the Curie temperature of the material of the one or more magnets 204. Additionally, or alternatively, such a temperature can correspond to at which the field strength of the one or more magnets 204 decreases by greater than about 10 percent.

To facilitate balancing the competing considerations of magnetic field strength with the temperature sensitivity of the one or more magnets 204, the nozzle 102 can include a thermal insulation layer 228. In general, the thermal insulation layer 228 can be thin, having a thickness of greater than about 0.5 mm and less than about 2 mm (e.g., having a thickness of between greater than about 0.8 mm and less than about 1.2 mm) and have lower thermal conductivity than the thermal conductivity of the portion of the housing 202 on which the thermal insulation layer 228 is mounted. For example, the thermal conductivity of the thermal insulation layer 228 can be greater than about 0.015 W/m-K and less than about 0.1 W/m-k. Exemplary materials suitable for use in the thermal insulation layer 228 can include a silica ceramic, an alumina-silica ceramic, and combinations thereof.

The thermal insulation layer 228 can be held in place on the housing 202 by the magnetic field formed by the one or more magnets 204. It should be appreciated that such placement of the thermal insulation layer 228 in this way can reduce or eliminate the need for other forms of fastening the thermal insulation layer 228 to the housing 202. Further, or instead, because the thermal insulation layer 228 does not need to be modified (e.g., drilled) to be mounted in this manner, mounting the thermal insulation layer 228 through the use of the one or more magnets 204 can be useful for retaining the thermal performance of the thermal insulation layer 228.

Additionally, or alternatively, the housing 202 can be thinner along a direction in which the magnetic field of the one or more magnets 204 extends through the housing 202 than in the direction in which electric current is conducted between the electrodes 206. That is, the one or more magnets 204 can be placed along the thinner portion of the housing 202 to facilitate creating a strong magnetic field in the firing chamber 216 through close placement of the one or more magnets 204. The electrodes 206 can be placed along the thicker portion of the housing 202 to facilitate, for example, mounting the electrodes 206. Additionally, or alternatively, in instances in which the electrodes 206 and the liquid metal 112' are separated by a molten interface (e.g., the interface 220) placement of the electrodes along the thicker portion of the housing can provide more significant spacing between the electrodes in the firing chamber 216 to facilitate controlling the respective interfaces 220 within the respective recesses 214 over the course of operation of the nozzle 10.

In certain instances, the nozzle 102 can include heat sinks 230 in thermal communication with the one or more magnets 204 to reduce the likelihood that heat from the housing 202 will adversely impact the magnetic properties of the one or more magnets 204. The heat sinks 230 can be, for example, spaced apart from the housing 202 to facilitate carrying heat away from the one or more magnets 204 while reducing the likelihood that the heat sinks 230 would interfere with control over temperature of the liquid metal 112' in the fluid chamber 208. The heat sinks 230 can carry heat away from the one or more magnets 204 through forced convection. For example, a cooling fluid (e.g., water) can be movable through the heat sinks 230 to provide cooling. Additionally, or alternatively, the nozzle 102 can include one or more fans directed at the heat sinks 230 provide forced air convective cooling. In such instances, the heat sinks 230 can be finned heat sinks of the type known in the art.

The use of the nozzle 102 in high-speed additive manufacturing processes can be facilitated through the use of the feeder system 104 to move metal through the system 100 to provide a continuous or substantially continuous supply of the liquid metal 112' to the fluid chamber 208. In particular, as described in greater detail below, the feeder system 104 can move the solid metal 112 toward the inlet region 210 at a rate sufficient to maintain the liquid metal 112' in the fluid chamber 208. Additionally, or alternatively, as also described in greater detail below, the feeder system 104 can remove debris formed in or around the inlet region 210, which can be useful for reducing downtime and/or part defects associated with such debris.

The feeder system 104 can include, for example, a plurality of rollers 232 engageable with the solid metal 112. The solid metal 112 can be in the form of a metal wire or other similar elongate shape such that the solid metal 112 is engaged in corresponding grooves defined by the plurality of rollers 232. In use, the plurality of rollers 232 can rotate relative to one another to feed the solid metal 112 toward the fluid chamber 208. In certain implementations, the heat produced by the heater 226 to heat the housing 202 and the fluid chamber 208 can melt the solid metal 112 as the solid metal 112 is moved into the vicinity of the inlet region 210.

In some implementations, the feeder system 104 can be actuatable to direct the solid metal 112 into the inlet region 210 at a variable rate. The variable rate can be based, for example, on a rate of ejection of the liquid metal 112' from the discharge region 212. The rate of ejection can be a measured rate of an actual amount of the liquid metal 112' ejection from the discharge region 212 (e.g., measured by a sensor directed at the liquid metal 112' being ejected from the discharge region 212). Additionally, or alternatively, the rate of ejection can be an estimate rate based on the amount of the liquid metal 112' required to satisfy fabrication requirements of the object 116 to a given point in the fabrication of the object 116. More generally, the variable rate can be useful for reducing the likelihood that the fluid chamber 208 will be depleted of the liquid metal 112' before an additional amount of the liquid metal 112' can be provided to the fluid chamber 208 by the feeder system 104.

In general, the solid metal 112 can melt into the liquid metal 112' at a position above the inlet region 210 and outside of the housing 202 or at a position within the inlet region 210. It should be appreciated, however, that melting the solid metal 112 too far into the inlet region 210 can cause interference with the pulsations of the electric current "I" in the liquid metal 112' in the fluid chamber 208. Also, or instead, melting the solid metal too far outside of the inlet region 210 can result in a discontinuity between the solid metal 112 and the liquid metal 112'. Such a discontinuity can be unfavorable, as it can lead to the introduction of air into the fluid chamber 208, which can disrupt the accurate and controlled formation of droplets. Such a discontinuity can also be unfavorable in that it may change the jetting by changing the boundary condition for reflections at the top of the build chamber.

Given these competing considerations, the system 100 can include, in certain implementations, a sensor 120 directed toward the inlet region 210 to detect an interface between the solid metal 112 and the liquid metal 112' along a predetermined axial distance on each side of the inlet region 210 (e.g., above and below an inlet orifice of the inlet region 210 and defining entry into the housing 202). As an example, the predetermined axial distance can be substantially equal to one-half of a maximum dimension of the inlet region 210. Thus, in instances in which the inlet region 210 has a circular cross section in a plane perpendicular to an axis defined by the inlet region 210 and the discharge region 212, the predetermined axial distance can be substantially equal to the radius of the inlet region 210 such that the sensor 120 can detect an interface between the solid metal 112 and the liquid metal 112' within a predetermined distance of one radius above an inlet orifice of the inlet region 210 and within a predetermine distance of one radius below an inlet orifice of the inlet region 210.

In certain instances, the sensor 120 can be in electrical communication with the feeder system 104 to change a rate of movement of the solid metal 112 into the inlet region 210 based on a signal received from the sensor 120. By way of example, and not limitation, the feeder system 104 can change a rate of rotation of the rollers 232 based at least in part on a position of the boundary between the solid metal 112 and the liquid metal 112'. Continuing with this example, more specifically, the rate of rotation of the rollers 232 can be increased to move the interface between the solid metal 112 and the liquid metal 112' further into the inlet region 210 or decreased to move the interface further out of the inlet region 210.

In some implementations, the sensor 120 can detect a discontinuity between the solid metal 112 and the liquid metal 112' along the predetermined axial distance on each side of the inlet region.

The sensor 120 can include any one or more of various sensors known in the art for detecting continuity of a material. For example, the sensor 120 can include machine vision directed at the inlet region 210. The machine vision can detect, for example, one or more of an interruption in the continuity of the solid metal 112 and the liquid metal 112' and a position of the interface between the solid metal 112 and the liquid metal 112'. Additionally, or alternatively, the sensor 120 can include an optical break-beam sensor directed across the liquid metal 112' near the inlet region 210 to detect an interruption in the of the continuity of the solid metal 112 and the liquid metal 112'.

In some implementations, the inlet region 210 can include a substantially funnel shape to reduce the likelihood of detaching the solid metal 112 from the liquid metal 112' as the solid metal 112 is moved toward the inlet region 210. The substantially funnel shape can be useful, for example, for accommodating slight variations in position of the solid metal 112 relative to the inlet region 210 caused by movement of the feeder system 104, the inlet region 210, or both.

As the solid metal 112 becomes liquid metal 112' in the vicinity of the inlet region 210, debris can form along or near the inlet region 210. Over time, the accumulation of such debris can increase the likelihood of contamination of the liquid metal 112' and, ultimately, contamination of the object 116 being fabricated. Accordingly, the feeder system 104 can include a wiper 234 movable relative to the inlet region 210 to remove debris adjacent to or within the inlet region 210. The wiper 234 can be, for example, a substantially rigid member movable across the housing 202 to remove debris from the inlet region 210. In certain implementations, the wiper 234 can be movable relative to the inlet region 210 during an interruption between the solid metal 112 and the liquid metal 112' (e.g., as part of a routine maintenance schedule, between fabrication of objects, or both). Typically, the wire can be withdrawn prior to the wiping action, and this wiping action is not performed while the liquid metal 112' is being ejected from the nozzle 102.

In certain implementations, the feeder system 104 can include a source 236 of pressurized gas actuatable to disperse pressurized gas relative to the inlet region 210 to remove debris adjacent to or within the inlet region 210. The pressurized gas can be, for example, a gas in the environment of the build chamber 110. Thus, in instances in which the gas in the environment of the build chamber 110 is an inert gas (e.g., nitrogen or argon), the pressurized gas can be the same inert gas. In certain implementations, the source 236 of pressurized gas can be arranged to directed the pressurized gas through the inlet region 210 in a direction toward the discharge region 212.

Additionally, or alternatively, removing debris adjacent to or within the inlet region 210 can include using MHD forces to remove debris in and adjacent to the inlet region. As a specific example, the polarity of the electric pulse E can be reversed relative to the polarity associated with ejection of the liquid metal 112' from the discharge region 212. With the polarity of the electric pulse E driven in this direction, the MHD force exerted on the liquid metal 112' in the fluid chamber 208 is in a direction from the discharge region 212 toward the inlet region 210. Driving the electric pulse E with sufficient magnitude, therefore, can produce an MHD force sufficient to eject the liquid metal 112' through the inlet region 210. It should be appreciated that the ejection of the liquid metal 112' in this direction can force debris away from the inlet region 210 and carry away debris that can be anywhere within the fluid chamber 208, including in throat of the discharge region 212.

Referring again to FIG. 1, the feeder system 104 can supply the solid metal 112 to the nozzle 102, and the nozzle 102 can eject the liquid metal 112', as the robotic system 106 moves the nozzle 102 relative to the build plate 114 along a controlled pattern within the working volume 108 of the build chamber 110. As used herein, the movement of the nozzle 102 relative to the build plate 114 should be understood to include any combination of relative movement of the nozzle 102 and the build plate 114 and, thus, includes movement of the nozzle 102 while the build plate 114 is stationary, movement of the build plate 114 while the nozzle is stationary 102, and movement of the nozzle 102 while the build plate 114 is also moving.

The robotic system 128 can be any of various different robotics systems are known in the art and suitable for moving components along a controlled pattern, such as a controlled two-dimensional pattern, a controlled three-dimensional pattern, or combinations thereof. For example, the robotic system 106 can include a Cartesian or x-y-z robotics system employing a number of linear controls to move independently in the x-axis, the y-axis, and the z-axis within the build chamber 110. Additionally, or alternatively, the robotic system 106 can include delta robots, which can, in certain implementations, provide significant advantages in terms of speed and stiffness, as well as offering the design convenience of fixed motors or drive elements. Other configurations such as double or triple delta robots can, additionally or alternatively, be used and can increase range of motion using multiple linkages. More generally, any robotics suitable for controlled positioning of the nozzle 102 and the build plate 114 relative to one another, especially within a vacuum or similar environment, may form part of the robotic system 106, including any mechanism or combination of mechanisms suitable for actuation, manipulation, locomotion and the like within the build chamber 138.

As the liquid metal 112' is ejected from the nozzle 102 to form the object 116 in the build chamber 110, the temperature of the object 116 being fabricated can be controlled to facilitate achieving desired deposition of the liquid metal 112' on the object 116. For example, the temperature of the object 116 can be controlled through heating the build plate 114 using, for example, closed loop temperature control as is known in the art. However, thermal communication between the build plate 114 and the surface of the object 116 being fabricated can decrease as successive layers are built on top of one another in instances in which the object 116 is a three-dimensional part. Accordingly, the system 100 can include a heater 122 to heat the environment within the build chamber 110. For example, the heater 122 can heat air or inert gas within the build chamber 110 to a target temperature. Additionally, or alternatively, the heater 122 can include a fan to circulate the heated air around the object 116 to maintain a target temperature of the object 116 through connective heat transfer.

Given that the droplets have high thermal conductivity associated with metals, the droplets can freeze rapidly upon landing on the object 116 if the object 116 is cool. This can limit the ability of an impinging droplet to merge into the object 116 being fabricated without leaving a void space which, in turn, can compromise the ability to make a fully dense part. Thus, in general, the temperature of the object 116 within the build chamber 110 can be controlled to promote impingement of the droplet to merge into the object 116. For example, the object 116 can be maintained at a temperature slightly below the solidus temperature so that the object 116 can be solid when new droplets arrive, but the object 116 extracts heat slowly from the freshly impinging droplets. Additionally, or alternatively, the temperature of the part can be lowered such that the newly impinging droplet has some amount of time before it freezes, but the newly impinging droplet freezes before the next droplets arises. Continuing with this example, such temperature control can reduce the likelihood that two droplets will merge to form a feature larger than intended and, thus, conversely, such temperature control can facilitate providing resolution to the object 116. As a specific example of such temperature control, if the droplets are being ejected from the nozzle 102 at a frequency of about 1 kHz, the temperature of the object 116 can be controlled to freeze in a time ranging from about 0.1 milliseconds to about 0.5 milliseconds after impingement. In this way, each droplet will be frozen before the next droplet arrives and, yet, each droplet will have some time to spread on the object 116, thus reducing the probability of unintended voids in the object 116. Additionally, the amount of time required to freeze a newly impinged droplet can be varied by changing the temperature of the housing 202 and the liquid metal 112' that is ejected. For example, raising the temperature of the liquid metal 112' that is ejected will generally increase the amount of time required for the droplet to freeze.

Further, or instead, because the droplets of the liquid metal 112', the object 116 can be reactive in certain environments, the build chamber 110 be controlled to be a substantially inert environment compatible with the metal being used for fabrication. For example, the build chamber 110 can include an inert gas such as argon or nitrogen. Additionally, or alternatively, the build chamber 116 can be an environmentally sealed chamber that can be evacuated with a vacuum pump 130 or similar device to provide a vacuum environment for fabrication.

In general, the three-dimensional printer 100 can include a control system 126 that can manage operation of the three-dimensional printer 100 to fabricate the three-dimensional object 116. For example, the control system 126 can be in electrical communication with one or more of the nozzle 102, the feeder system 104, the robotic system 106, the build plate 114, the electric power source 118, the sensor 120, and the heater 122. Thus, for example, the control system 124 can actuate the robotic system 106 to move the nozzle 102 along a controlled three-dimensional pattern and additionally, or alternatively, the control system 124 can actuate the feeder system 104 to move the solid metal 112 toward the inlet region 210 and actuate the electrical power source 118 to control ejection of the liquid metal 112' from the nozzle 102 as one or more of the nozzle 102 and the build plate 130 are moved along the controlled pattern. The controlled pattern can be based on a model 126 stored, for example, in a database 128, such as a local memory of a computer used as the control system 124, or a remote database accessible through a server or other remote resource, or in any other computer-readable medium accessible to the control system 124. In certain implementations, the control system 124 can retrieve the model 126 in response to user input, and generate machine-ready instructions for execution by the three-dimensional printer 100 to fabricate the object 116. More generally, unless otherwise specified or made obvious from the context, the control system 126 can be used to control one or more portions of the three-dimensional printer 100 according to any one or more of the various different methods described herein.

Figure 3:
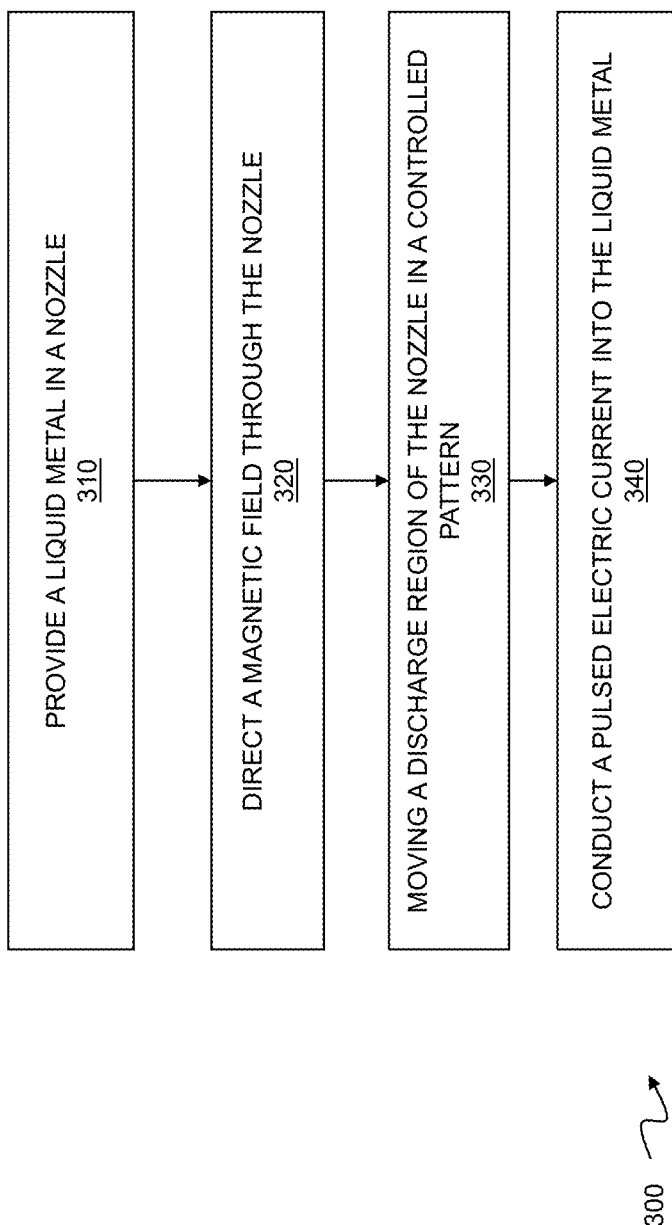
FIG. 3 is a flow chart is a flowchart of an exemplary method of printing liquid metal through the application of MHD forces.

FIG. 3 is a flowchart of an exemplary method 300 of printing liquid metal through the application of MHD forces. It should be appreciated that the exemplary method 300 can be carried out using, for example, any one or more of the three-dimensional printers described herein and, thus, can be carried out using the three-dimensional printer 100 described above with respect to FIGS. 1-2D. It should be further appreciated that the exemplary method 300 can be implemented in addition to or instead of any one or more of the other methods described herein, unless otherwise stated or made clear from the context.

As shown in step 310, the exemplary method can include providing a liquid metal in a fluid chamber. The fluid chamber can be any one or more of the various different fluid chambers described herein and, thus, be at least partially defined by any one or more of the housings described herein and can have an inlet region and a discharge region.

As shown in step 320, the exemplary method can include directing a magnetic field through the nozzle. For example, the magnet can be positioned close enough to the fluid chamber such that the magnetic field of the magnet passes through a portion of the nozzle containing the liquid metal.

As shown in step 330, the exemplary method can include moving the discharge region of the fluid chamber in a controlled pattern. The discharge region can be moved along the controlled pattern through, for example, actuation of a robotic system such as the robotic system 106 described above with respect to the three-dimensional printer 100. In certain implementations, the controlled pattern can be a three-dimensional pattern used to form a three-dimensional object through successive delivery of layers of the liquid metal. Additionally, or alternatively, the controlled pattern can be a two-dimensional pattern used, for example, to form a pattern or trace on a substrate or other two-dimensional surface.

As shown in step 340, the exemplary method can include conducting a pulsed electric current into the liquid metal in a firing chamber within the fluid chamber between the inlet region and the discharge region. The pulsed electric current can intersect the magnetic field in the firing chamber to exert MHD force on the liquid metal in the firing chamber, as described above. In particular, the pulsation of the electric current can intersect the magnetic field to eject the liquid metal from the discharge region to form an object (e.g., a three-dimensional object). In general, the characteristics of the pulsed electric current can be based on the position of the discharge region along the controlled pattern. For example, the pulse frequency can be lower when ejecting liquid metal onto an aspect of the part that has high geometric curvature in a build plane. Similarly, the pulse magnitude, duration, or both can be based on the position of the discharge region along the controlled pattern to control the size of the liquid metal droplets based on the position along the controlled pattern.

In general, the pulsed electric current can be conducted into the liquid metal in the firing chamber at a frequency that is less than a resonance frequency of the liquid metal in the fluid chamber in which the firing chamber is disposed. For example, based on features of the nozzles described herein, the resonant frequency of the liquid metal in the fluid chamber can be greater than about 20 kHz. Accordingly, as the discharge region 212 moves along the controlled pattern, the frequency of the pulsed electric current can be varied below 20 kHz, as necessary to achieve accuracy and speed targets associated with fabrication of the object.

In certain implementations, the frequency of the pulsed electric current can be varied based on a speed of travel of the discharge region along the controlled pattern. Thus, for example, the pulsed electric current can have a lower frequency as a robotic system moves the discharge region at a slower speed, and the frequency of the pulsed electric current can have a higher frequency as the robotic system moves the discharge region at a higher speed. Additionally, or alternatively, the frequency of the pulsed electric current can be based on the position of the discharge orifice along the controlled pattern.

Figure 4:
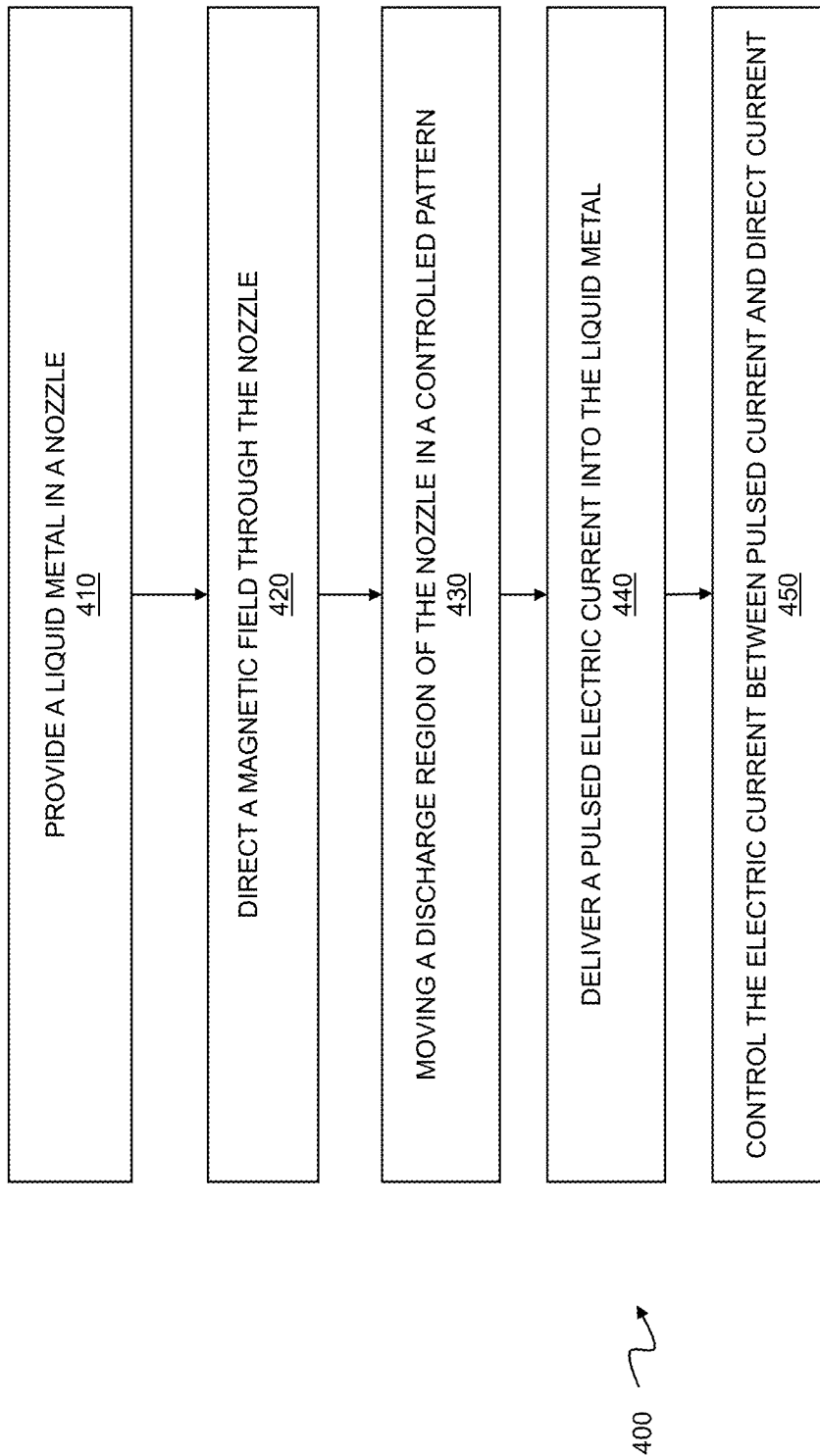
FIG. 4 is a flowchart of an exemplary method of controlling electric current between a pulsed current mode and a direct current mode to control a rate of liquid metal ejection through MHD forces.

FIG. 4 is a flowchart of an exemplary method 400 of controlling electric current between a pulsed current mode and a direct current mode to control a rate of liquid metal ejection through MHD forces. It should be understood that, in general, the pulsed current mode can result in the production of discrete droplets of the liquid metal. By comparison, the direct current mode can result in the production of a substantially constant stream of the liquid metal. It should be appreciated, therefore, that switching between the pulsed current and the direct current can advantageously provide control over both accuracy and speed of fabrication of an object using any one or more of the three-dimensional printers described herein. It should be further appreciated that the exemplary method 400 can be implemented using any one or more of the various three-dimensional printers described herein and can be implemented in addition to or instead of any one or more of the other methods described herein, unless otherwise stated or made clear from the context.

As shown in step 410, the exemplary method 400 can include providing a liquid metal in a fluid chamber. The fluid chamber can be any one or more of the fluid chambers described herein and, therefore, can be defined by a housing and can have an inlet region and a discharge region.

As shown in step 420, the exemplary method 400 can include directing a magnetic field through the housing. The magnetic field can be directed through the housing by any one or more of the magnets described herein. Thus, for example, the magnetic field can be directed through the housing by one or more magnet supported on the housing and in close proximity to the liquid metal in the fluid chamber, even as the liquid metal is heated to high temperatures (e.g., greater than about 150° C. or higher temperatures typically associated with significant degradation of magnetic properties of the one or more magnets).

As shown in step 430, the exemplary method 400 can include moving the discharge region of the fluid chamber in a controlled pattern. The controlled pattern can be based, for example, on a model of the object being fabricated. Thus, for example, in instances in which the model being fabricated is a three-dimensional object, the controlled pattern can be a three-dimensional pattern based on a three-dimensional model of the object.

The requirements for accuracy of placement of the liquid metal can vary along the controlled pattern. For example, in certain instances, a greater degree of accuracy can be required along a boundary of the object being fabricated. Achievement of the requisite accuracy along a boundary region, therefore, can be achieved through ejection of discrete droplets. More specifically, control over parameters such as parameters such as droplet size, shape, velocity, direction, and cooling can be useful for depositing metal on the surface of the object with a great deal of accuracy. Such accuracy, however, is generally at the expense of the time required for fabrication of the object. As another example, a lesser degree of accuracy can be required away from the boundary of the object being fabricated (e.g., a portion of the object defined between the boundary). In these regions, liquid metal can be advantageously ejected using less time-consuming techniques to reduce the time required for fabrication of the object.

As shown in step 440, the exemplary method 400 can include delivering electric current between electrodes defining at least a portion of a firing chamber within the fluid chamber between the inlet region and the discharge region. The electric current can intersect the magnetic field in the liquid metal in the firing chamber to produce an MHD force sufficient to eject the liquid metal from the discharge region.

As shown in step 450, the exemplary method 400 can include controlling the electric current between pulsed current and direct current to form an object. In general, controlling the electric current between pulsed electric current and direct current can be based on the position of the discharge region along the controlled pattern. Thus, for example, the electric current can be controlled to be pulsed electric current along a boundary of the object being formed and to be direct current along an excursion within the boundary of the object being formed. Such switching between pulsed electric current and direct current can, for example, facilitate accurate control of liquid metal deposition along the boundary of the object being fabricated while also facilitating rapid fabrication of the object away from the boundary of the object.

In general, the frequency of the pulsed current can be controlled according to any one or more of the various methods of controlling pulsed electric current described herein. Thus, for example, the frequency of the pulsed current can be less than a resonance frequency of the liquid metal in the fluid chamber. Further, or instead, the frequency of the pulsed current can be based on speed of movement of the discharge region along the controlled pattern. In certain implementations, the frequency of the pulsed current can be less than 20 kHz at a maximum speed of movement of the discharge region along the controlled pattern. In some implementations, the frequency of the pulsed current can be based on a distance of the discharge region 212 from an edge of the controlled pattern. Thus, for example, as the discharge region 212 slows down upon approaching an edge of the controlled pattern, the frequency of the pulsed current can decrease accordingly.

Switching from the pulsed current to the direct current can increase a mass flow rate of the liquid metal from the discharge region. Thus, for example, a discharge rate of the liquid metal under MHD forces produced by delivering direct current into the firing chamber can be greater than a maximum discharge rate of the liquid metal achieved under the maximum frequency of the pulse current (e.g., a maximum frequency below a resonance frequency of the liquid metal in the fluid chamber). Accordingly, switching from the pulsed current to the direct current can facilitate depositing the liquid metal at a faster rate, as compared to only pulsing the electric current.

Figure 5:
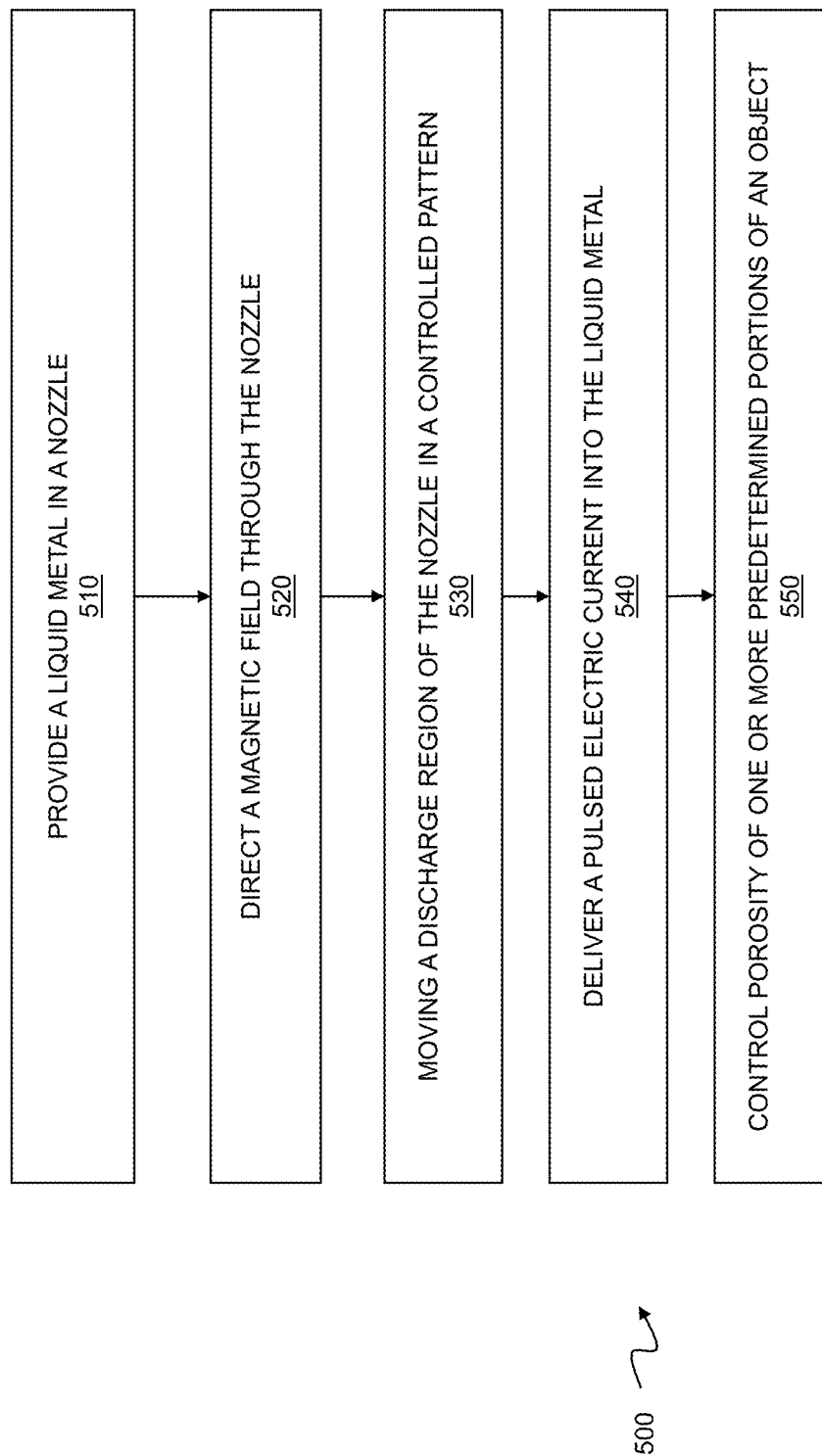
FIG. 5 is a flowchart of an exemplary method of using MHD forces to form a part having one or more porous features facilitating separation of a part from a support structure of the part.

FIG. 5 is a flowchart of an exemplary method 500 of using MHD forces to form a part having one or more porous features facilitating separation of a part from a support structure of the part. That is, an object can include a part and a support structure of the part. The exemplary method 500 can be used to form one or more porous features at one or more interfaces between the part and the support structure of the part. In use, the part can be preferentially separated from the support structure along the one or more porous features. It should be appreciated that the exemplary method 500 can be implemented using any one or more of the various three-dimensional printers described herein and can be implemented in addition to or instead of any one or more of the other methods described herein, unless otherwise stated or made clear from the context.

As shown in step 510, the exemplary method 500 can include providing a liquid metal in a fluid chamber. The fluid chamber can be any one or more of the fluid chambers described herein and, thus, can be partially defined any one or more of the housings described herein and can have an inlet region and a discharge region.

As shown in step 520, the exemplary method 500 can include directing a magnetic field through the housing. The magnetic field can be directed into the housing by one or more of the magnets described herein.

As shown in step 530, the exemplary method 500 can include moving the discharge region of the fluid chamber in a controlled three-dimensional pattern. The controlled three-dimensional pattern can correspond, for example, to an object having a part and a support structure. As used herein, the term support structure can include any portion of the object used to support a portion of the part during fabrication (including printing and post-processing (e.g., sintering)) and, thus, the support structure itself can be another part such that the object includes a plurality of parts and the introduction of the porosity into the object can facilitate separation of the plurality of parts.

As shown in step 540, the exemplary method 500 can include delivering electric current between electrodes at least partially defining a firing chamber within the fluid chamber between the inlet region and the discharge region. The electric current can intersect the magnetic field in the liquid metal in the firing chamber to eject the liquid metal from the discharge region according to any one or more of the methods described herein. The electric current can be delivered using one or more of pulsed current or direct current. For example, the electric current can be delivered as direct current away from an interface between a part and a support structure or another part, and the electric current can be delivered as pulsed current along the interface.

As shown in step 550, the exemplary method 500 can include controlling porosity of one or more predetermined portions of the object being fabricated. For example, the porosity of one or more predetermined portions of an accumulation of the ejected liquid metal on a build plate or on a previously deposited layer of metal as the object is being fabricated. In general, the porosity can be controlled to form interfaces between a support structure and a part, with the porosity of the interface having a higher porosity than the porosity of the support structure and the part. For example, the support structure, the interface, and the part can be formed of the same material such that the change in porosity at the interface can define the weakest point in the object and, thus, form a location of preferential separation of the support structure from the part. In certain instances, the interface can be frangible such that, for example, the support structure and the part can readily separate from one another through the application of one or more of a compressive force and a shear force at the interface. In certain instances, sufficient separation force can be provided as a manual force, a force applied by a hand tool (e.g., pliers), or a combination thereof.

Controlling porosity of the one or more predetermined portions can include, for example, changing velocity of the liquid metal droplets ejected from the discharge region of the fluid chamber. As an example, an interface can be formed by ejecting the liquid metal from the discharge orifice at a lower velocity than a velocity associated with formation of one or both of the support structure and the part. In general, the liquid metal ejected at the lower velocity will not penetrate the target material as completely as the liquid metal ejected at a higher velocity. Such limited penetration can result in increased porosity which can be advantageous in the context of forming an interface useful for separating a part from a support structure or another part.

In general, the velocity of droplets of the liquid metal ejected from the discharge region of the fluid chamber is a function of the magnitude and the duration of the pulse used to form the respective droplet. Accordingly, controlling porosity can include changing at least one of the magnitude and the duration of the pulses along the interface. For example, as compared to the magnitude of the pulses used to form the object away from the interface, the interface can be formed by liquid metal droplets ejected using pulses of lower magnitude impulse. The velocity of the liquid metal ejected from the discharge region can be controlled, for example, by changing one or more of magnitude and duration of the pulse.

Additionally, or alternatively, controlling porosity of the one or more predetermined portions can include changing temperature of the liquid metal ejected from the discharge region. For example, liquid metal droplets ejected at lower temperature can solidify on a target surface more readily than liquid metal droplets ejected at higher temperatures can solidify on the target surface. Thus, liquid metal droplets ejected at lower temperature tend to spread less on the target surface and, thus, can form a region of increased porosity. Accordingly, in certain implementations, controlling porosity of the one or more predetermined portions can include reducing the temperature of the liquid metal in the fluid chamber.

Figure 6:
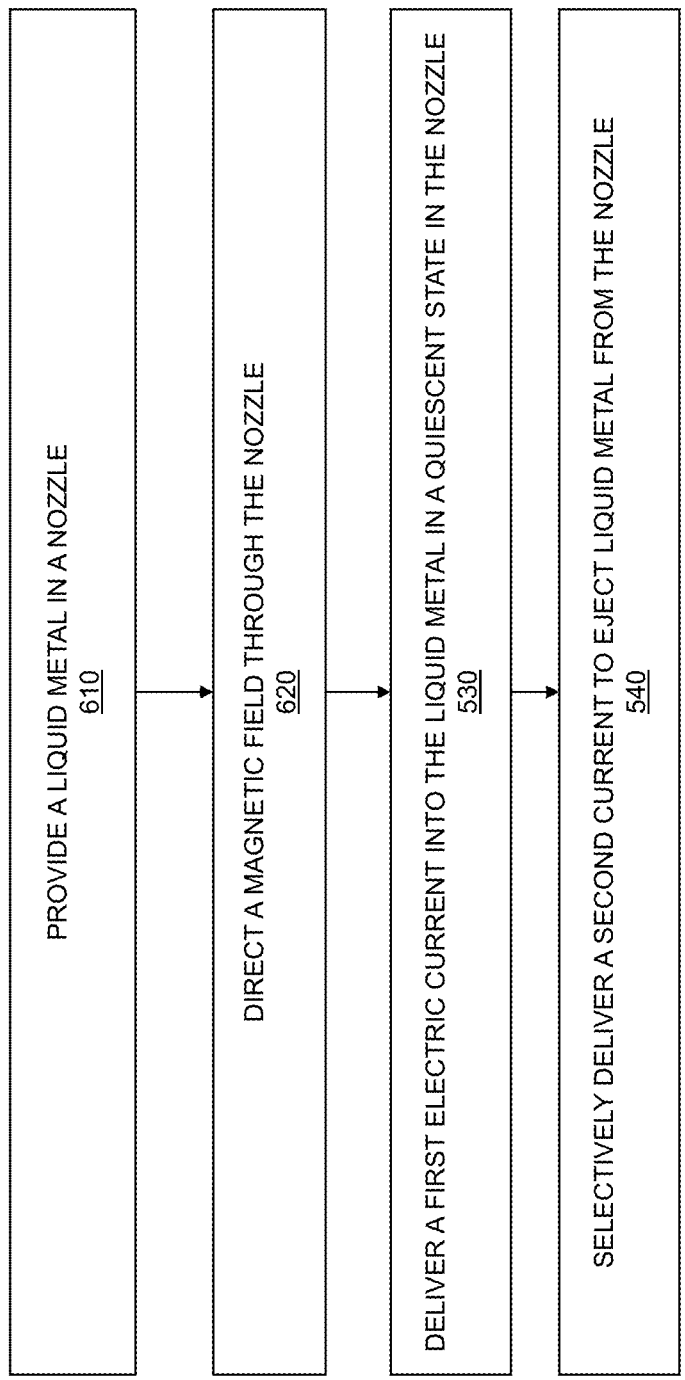
FIG. 6 is a flowchart of an exemplary method of using MHD force to pull back a meniscus of quiescent liquid metal in a fluid chamber.

FIG. 6 is a flowchart of an exemplary method 600 of using MHD force to pull back a meniscus of quiescent liquid metal in a fluid chamber. It should be appreciated that the exemplary method 600 can be implemented using any one or more of the various three-dimensional printers described herein and can be implemented in addition to or instead of any one or more of the other methods described herein, unless otherwise stated or made clear from the context.

As shown in step 610, the exemplary method 600 can include providing a liquid metal in a fluid chamber. The fluid chamber can be, for example, any one or more of the fluid chambers described herein and, therefore, can be defined by any one or more of the housings described herein and can have an inlet region and a discharge region.

As shown in step 620, the exemplary method 600 can include directing a magnetic field through the housing. The magnetic field can be directed into the housing by any one or more of the magnets described herein.

As shown in step 630, the exemplary method 600 can include delivering a first electric current into the liquid metal in the housing in a quiescent state. As used herein, a quiescent state of the liquid metal in the housing can include a state of the liquid metal between ejection of the liquid metal from a discharge portion of the housing and, thus, can include a state of the liquid metal in which a meniscus is attached to the discharge portion of the housing (e.g., attached to the discharge portion within a throat of the discharge portion or attached to a discharge orifice of the discharge portion and extending slightly outside of the housing).

The first electric current can be directed in a direction to intersect the magnetic field in the liquid metal in a direction creating an MHD force that exerts a pullback force on the liquid metal. For example, in implementations in which the magnetic field is constant, the first electric current can have a polarity opposite a polarity that produces an ejection force on the liquid metal. Because the interaction of the electric current and the magnetic field obeys the right-hand rule, it should be appreciated that directing the first electric current in a direction opposite a polarity associated with an ejection force will produce an MHD force that is substantially opposite the ejection force and, therefore, can pull back the liquid metal.

The amount of pullback force exerted on the liquid metal is a function of the magnitude of the first electric current. Typically, the pullback force is sufficient to overcome a pressure head of the quiescent liquid metal in the fluid chamber to move the meniscus, without otherwise significantly moving the liquid metal. Thus, in general, the pullback force is significantly less than the force required to eject the liquid metal. Accordingly, the magnitude of the first electric circuit is generally small relative to the magnitude of an electric current used to eject the liquid metal from the discharge region. For example, the first electric current can have a magnitude of greater than about 1 amp and less than about 100 amps (e.g., about 2 amps to about 20 amps).

Figure 7B:
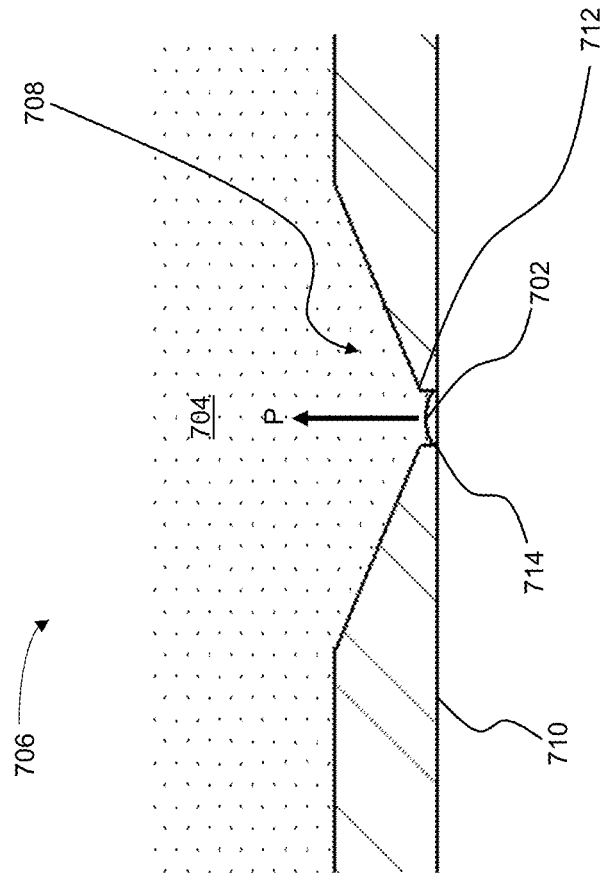
FIGS. 7A and 7B is a series of schematic representations comparing a position of a meniscus of a quiescent liquid metal of a nozzle as a pullback force is applied to the meniscus.
Figure 7A:
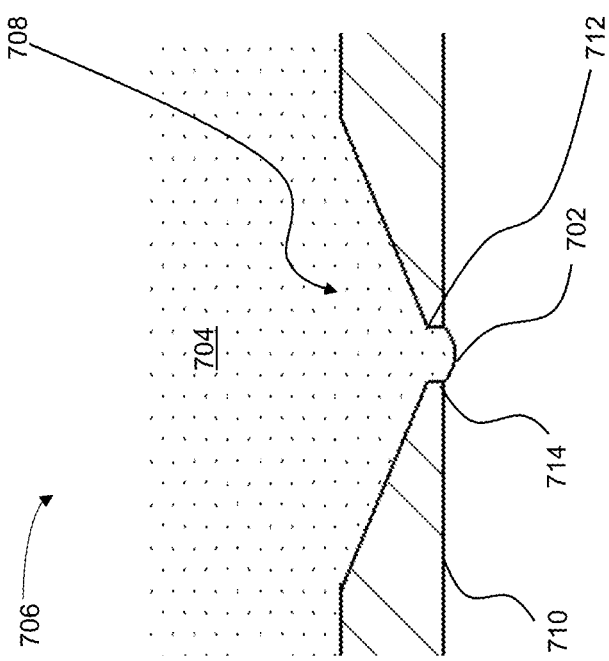

FIGS. 7A and 7B is a series of schematic representations comparing a position of a meniscus 702 of a quiescent liquid metal 704 of a nozzle 706 as a pullback force P is applied to the meniscus 702. It should be understood that the pullback force P can be, for example, a pullback force generated by the first electric current in step 630 in FIG. 6.

As shown in FIG. 7A, in the absence of a pullback force, the meniscus 702 can be pushed out of a discharge portion 708 of the of the nozzle 706. The meniscus 702 can extend out of the discharge portion 708 by the pressure created by the weight of the quiescent liquid metal 704 above the meniscus. Without the application of a pullback force, some of the liquid metal 704 can, under certain conditions, migrate out of the nozzle 706 and onto the bottom surface 710 of the nozzle 706. Such migration can interfere with the subsequent ejection of droplets of the liquid metal 704 (e.g., by forming droplets larger in size than intended). Accordingly, it should be appreciated that reducing the likelihood of migration of the quiescent liquid metal 704 onto the bottom surface 710 can usefully improve accuracy of the droplets that can be delivered from the nozzle 706.

As shown in FIG. 7B, the pullback force P can push the meniscus 702 in a direction away from the bottom surface 710. Accordingly, the pullback force P can reduce the likelihood that the meniscus 702 will migrate onto the bottom surface 710. In fact, if some of the liquid metal 704 does accumulate on the bottom surface 710 (e.g., from an errant droplet), the negative pressure established by the pullback force P can suck the liquid metal 704 from the bottom surface 710 into the discharge portion 708 of the nozzle 706.

For example, the discharge portion 708 can include a throat 712 and a discharge orifice 712. The pullback force P can be sufficient to maintain the meniscus 702 of the liquid metal, in a quiescent state, attached to the discharge portion 708 of the nozzle 706. In certain implementations, the pullback force P can pull the meniscus 702 into the throat 712 of the discharge portion 712. Additionally, or alternatively, the pullback force P can maintain the meniscus 702 attached to the discharge orifice 712.

Referring again to FIG. 6, as shown in step 640, the method 600 can include selectively delivering a second electric current into the liquid metal. The second electric current can intersect the magnetic field in the liquid metal to exert a firing force on the liquid metal to eject the liquid metal from the discharge region. Thus, for example, the second electric current can be selectively delivered into the liquid metal as the discharge region of the nozzle is moved along a controlled pattern (e.g., a controlled three-dimensional pattern). For example, the second electric current can be selectively delivered into the liquid current along less than the entirety of the controlled pattern such that the second electric current is periodically interrupted as the discharge region is moved along the controlled pattern. More generally, the second electric current can be directed into the liquid metal according to any one or more of the various different methods described herein. Accordingly, the second electric current can be variable based at least in upon a position of the discharge orifice along the controlled pattern. Additionally, or alternatively, the second electric current can include a pulsed electric current, a direct electric current, or a combination thereof. In instances in which the second electric current includes a pulsed electric current, delivering the second electric current into the liquid metal in the feed path can include conducting a firing pulse into the liquid metal in the feed path and conducting a pullback pulse into the liquid metal in the feed path (e.g., before the firing pulse, after the firing pulse, or both) according to any one or more of the various different methods described herein.

The second electric current can be selectively delivered into the liquid metal between electrodes defining a firing chamber within the fluid chamber between the inlet region and the discharge region, according to any one or more of the various different methods described herein. In certain instances, delivering the first electric current can be directed into the liquid metal between the electrodes. Thus, more generally, the first electric current and the second electric current can be delivered into the liquid metal along the same path.

In certain implementations, the first electric current can be continuously applied to the liquid metal and the second electric current can be superimposed on the first electric current. Since the magnitude of the second electric current is larger than the first electric current, the desired ejection of the liquid metal occurs. Because the first electric current is continuously applied, the meniscus will be pulled back (e.g., as shown in FIG. 7B) between pulses of the second electric current. While the first electric current has been described as being continuously applied to the liquid metal, it should be appreciated that, in certain implementations, the first electric current can be turned off during an ejection pulse of the second electric current and the turned back on immediately after the ejection pulse of the second electric current.

Figure 8:
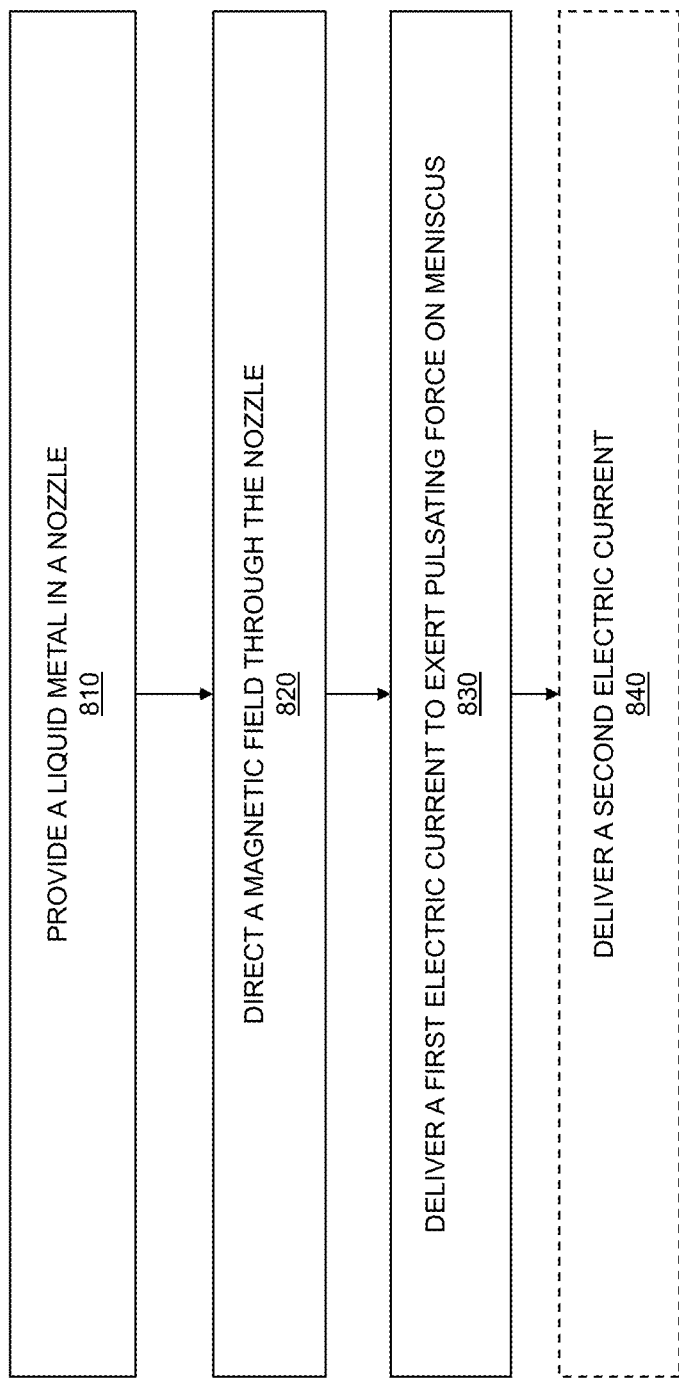
FIG. 8 is a flowchart of an exemplary method 800 of using MHD force to bounce a meniscus of a quiescent liquid metal in a discharge region of a nozzle.

FIG. 8 is a flowchart of an exemplary method 800 of using MHD force to bounce a meniscus of a quiescent liquid metal in a discharge region of a nozzle. It should be appreciated that the exemplary method 800 can be implemented using any one or more of the various three-dimensional printers described herein and can be implemented in addition to or instead of any one or more of the other methods described herein, unless otherwise stated or made clear from the context.

As shown in step 810, the method 800 can include providing a liquid metal in a fluid chamber. The fluid chamber can be any one or more of the fluid chambers described herein and, therefore, can be at least partially defined by a housing and can have an inlet region and a discharge region.

As shown in step 820, the method 800 can include directing a magnetic field through the housing. The magnetic field can be directed through the housing using, for example, any one or more of the magnets described herein.

As shown in step 830, the method 800 can include delivering a first electric current into the liquid metal in a firing chamber within the fluid chamber and between the inlet region and the discharge region. In general, the first electric current can include a fluctuating electric current intersecting the magnetic field in the liquid metal to exert a pulsating force on a meniscus attached to the discharge region. As used herein, a fluctuating electric current shall be understood to include a substantially sinusoidal electric current, a pulsed electric current, or combinations thereof. In response to the pulsating force on the meniscus, the meniscus can bounce—that is, to cause the meniscus to deflect and then relax alternately. For example, the discharge region can include a discharge orifice and a throat, and the meniscus can be attached to one or more of the throat and the discharge orifice and, in this position, the meniscus can undergo alternate deflections in response to the first electric current.

Liquid metals can build up a skin of metal oxide by reaction with even trace levels of oxygen and sometimes water vapor present in the atmosphere. These metal oxides tend to be strong and, once thick enough, can interfere with ejection as desired (e.g., preventing ejection from taking place). However, these oxide skins are also quite brittle. Accordingly, the bouncing movement of the meniscus in response to the first electric current can facilitate keeping the surface of the liquid metal in the meniscus flexible (e.g., by introducing cracks in the film) and, thus, reducing the likelihood that the presence of a film will disable ejection of a droplet on demand.

The first electric current can be delivered over a wide range of frequencies (e.g., a range of frequencies over which the meniscus can respond). In certain implementations, the oscillations produced by the first electric current can be kept below the first resonant frequency of the liquid metal in the fluid chamber such that adequate control over the pulsation can be maintained. However, in implementations in which it is desirable to use a small current to excite oscillations in the meniscus, the first electric current can be deliverable provided at or near the resonance frequency of the liquid metal in the fluid chamber. In typical applications, the amplitude of oscillation can be greater than about 1 percent and less than about 50 percent (e.g., greater than about 5 percent and less than about 25 percent) of the diameter of a discharge orifice of the fluid chamber.

In some instances, the method 800 can further include ejecting the liquid metal through the discharge region to clear the meniscus from the discharge region. Such ejection of the liquid metal through the discharge region can be done, for example, away from the part. In general, it should be appreciated that such ejection of the liquid metal through the discharge region can be useful for refreshing the meniscus, particularly if the meniscus has been in the discharge region for a long period of time. In certain instances, the liquid metal can be ejected from the discharge region for a predetermined period of time.

As shown in step 840, the method 800 can further include delivering a second electric current into the liquid metal in the firing. The second liquid metal can intersect the magnetic field in the liquid metal to eject the liquid metal through the discharge region to form an object. It should be understood the second electric current can include a pulsed electric current different from (e.g., much greater than) the pulsed electric current of the first electric current. Because the second electric current is delivered to eject the liquid metal to form an object, it should be further understood that the second electric current can be delivered into the liquid metal based on a position of the discharge region along a controlled pattern (e.g., a three-dimensional pattern) according to any one or more of the various different methods described herein. Thus, by way of example and not limitation, delivering the second electric current into the liquid metal in the firing chamber can include switching between a pulsed electric current a direct electric current based at least in part on a position of the discharge orifice along the controlled pattern.

The first electric current can be stopped a short period before delivery of the second electric current. During this short period, the oscillations induced in the meniscus by the first electric current can decay prior to ejection of a first droplet ejected in response to the second electric current. Thus, more generally, stopping the first electric current shortly before delivery of the second electric current can reduce the likelihood that the first electric current can interfere with the first ejection of the liquid metal or with subsequent ejections of the liquid metal during the fabrication of an object. In addition, or in the alternative, the first electric current can be delivered to the meniscus during periods in which a printhead associated with the fluid chamber is not actively printing (e.g., while the printhead is moving between aspects of the object being fabricated or while the printhead is waiting for a new layer to commence).

While certain implementations have been described, other implementations are additionally, or alternatively, possible.

Figure 9:
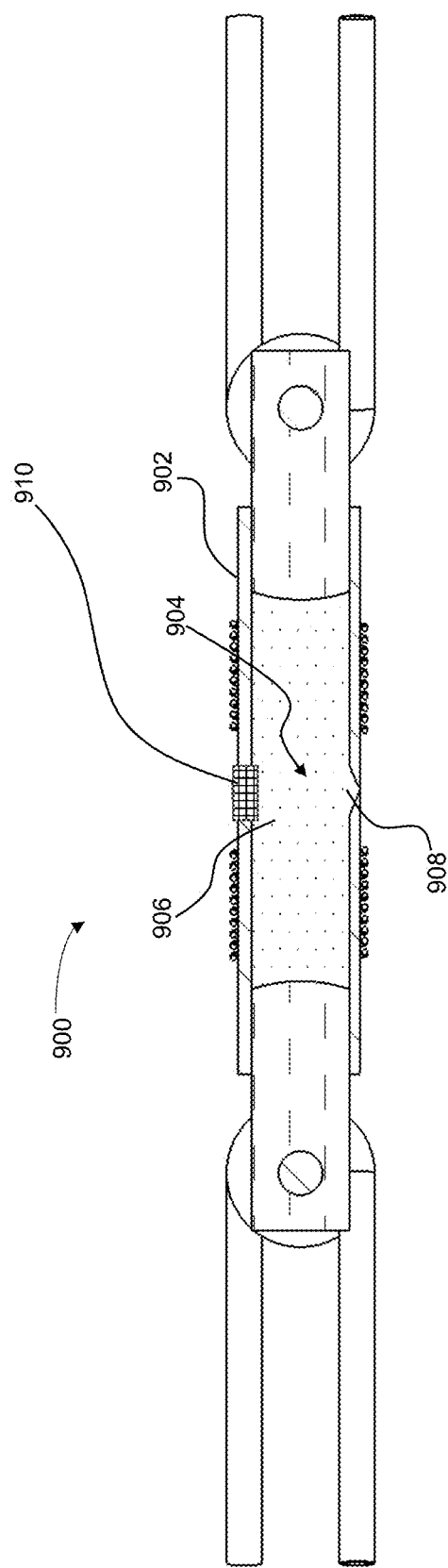
FIG. 9 is a cross-sectional side view of a nozzle including a filter along an inlet region of a fluid chamber.

For example, while devices, systems, and methods related to certain aspects of removing debris from inlet regions have been described, other devices, systems, and methods of debris removal are additionally or alternatively possible. For example, as shown in FIG. 9, a nozzle 900 can include a housing 902 defining at least a portion of a fluid chamber 904 having an inlet region 906 and a discharge region 908. The nozzle 900 can include a filter 910 disposed along the fluid chamber 904. In general, the filter 910 can act as a filter of last resort, reducing the likelihood the debris will reach the discharge region 908 and be ejected during manufacturing of an object. Thus, the filter 910 can be spaced apart from the discharge region 904. As an example, the filter 910 can be disposed along the inlet region 906. In general, the filter 910 can include a porous structure formed of a material that can withstand the temperature of a molten metal in contact with the filter 910. In certain implementations, the filter 910 can advantageously decrease resonance vibrations fluid chamber 904 as compared to the same fluid chamber without a filter, for example, by absorbing the energy in an acoustic pulse moving in the fluid chamber 904.

Figure 10:
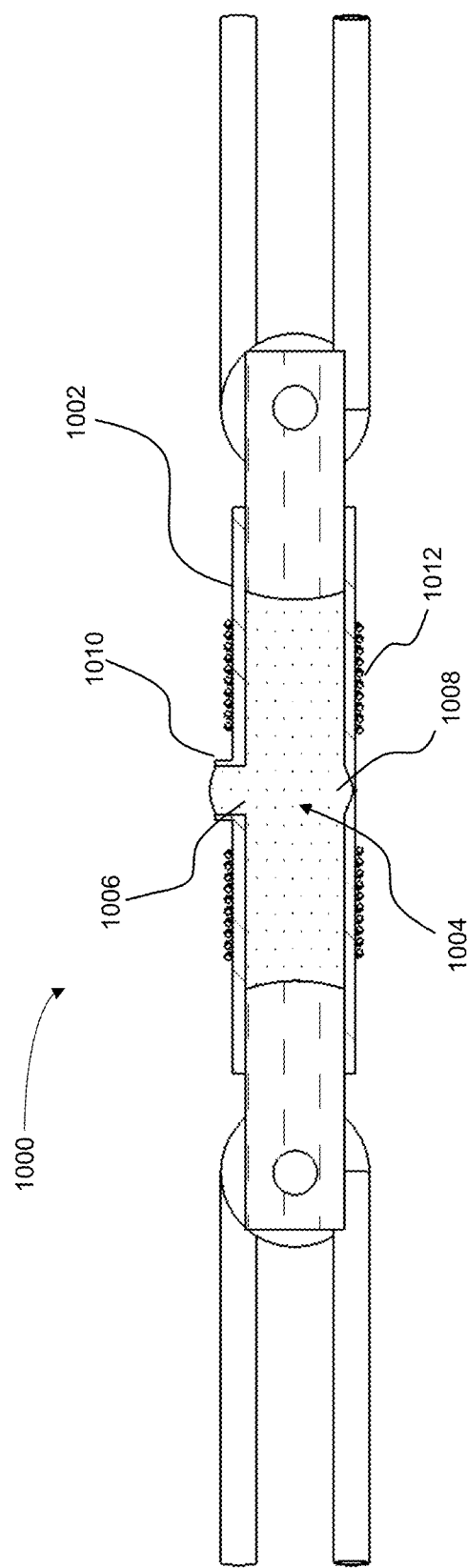
FIG. 10 is a cross-sectional side view of a nozzle including a chimney along an inlet region of a fluid chamber.

Referring now to FIG. 10, a nozzle 1000 can include a housing 1002 defining at least a portion of a fluid chamber 1004 having an inlet region 1006 and a discharge region 1008. Along the inlet region 1006, the housing 1002 can include a chimney 1010 extending from the housing 1002 in a direction away from the fluid chamber 1004. The chimney 1010 can, for example, reduce the likelihood that a meniscus of liquid metal along the inlet region 1006 will wet an outer surface of the housing defining the inlet region 1006. Thus, for example, by reducing wetting along the housing 1002, the chimney 1008 can reduce the likelihood of damage to components carried on the housing 1002, such as a heater 1012.

Figure 11:
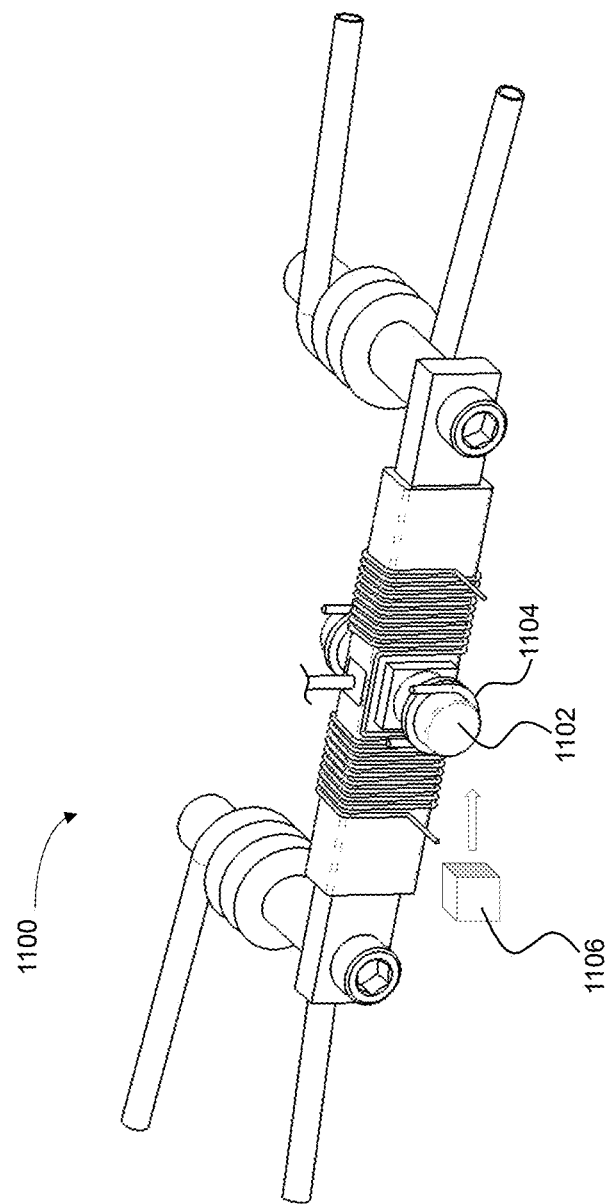
FIG. 11 is an isometric view of a nozzle including a fan-cooled magnet.

As another example, while nozzles have been described as including liquid-cooled magnets, other implementations are additionally or alternatively possible. For example, referring now to FIG. 11, a nozzle 1100 can include one or more magnets 1102, a heat sink 1104, and a fan 1106. The fan 1106 can be positioned to direct air over heat sink 1004 to carry heat away from the one or more magnets 1102 through forced air convection.

Figure 12:
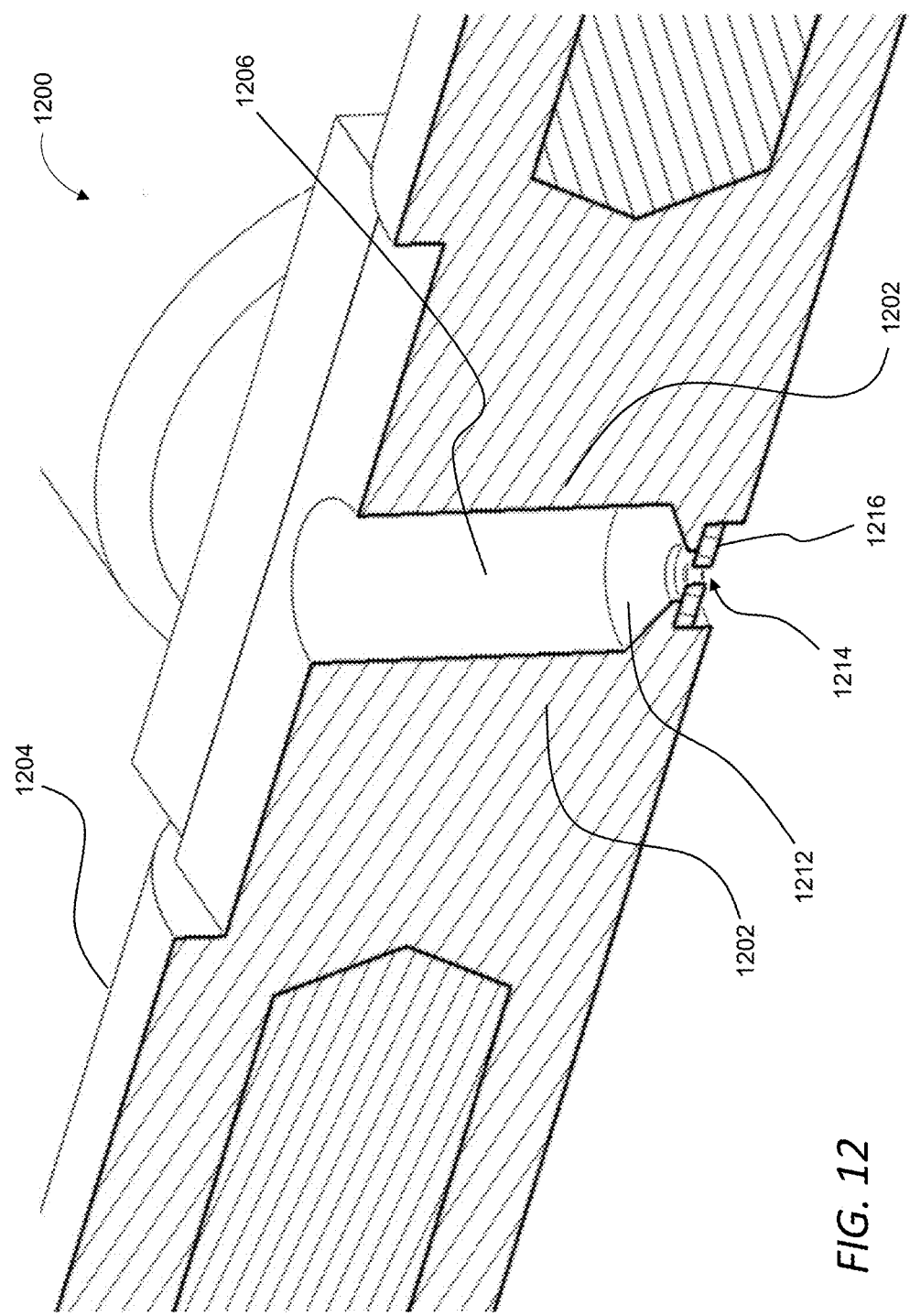
FIG. 12 is an isometric view of a cross-section of a nozzle including electrode integrally formed with at least a portion of a housing.

As still another example, while nozzles have been described as including metal electrodes defining a fluid chamber and carried in a ceramic housing, other implementations are additionally or alternatively possible. For example, referring now to FIG. 12, a nozzle 1200 can include electrodes 1202 integrally formed with a portion of a housing 1204 defining at least one portion of a fluid chamber 1206 (e.g. a portion of a fluid chamber away from a discharge orifice 1208). The fluid chamber 1206 can have an inlet region 1210 and a discharge region 1212. The portion of the housing integrally formed with the electrodes 1202 should be understood to be a metal material.

As used herein, "integral" includes components formed of a unitary piece of material such as a solid block or rod of material and, thus, formed of the same type of material. For example, the housing electrodes 1202 and the housing 1204 can be integrally formed from a rod (e.g., a rod of a ubiquitously available standard size) such that electric current can be directed in an axial direction along the rod and a magnetic field can be directed radially through the rod. In general, the fluid chamber 1206 can be formed by removing material (e.g., drilling a thru-hole) from the integrally formed electrodes 1202 and housing 1204. Integrally forming the electrodes 1202 and the housing 1204 can be advantageous, for example, for producing the nozzle 1200 with a low thermal mass, which can be useful for accurately controlling temperature of liquid metal in the fluid chamber 1206. Additionally, or alternatively, integrally forming the electrodes 1202 and the housing 1204 can be useful for positioning one or more magnets close to the liquid metal in the fluid chamber 1206 such that the strength of the magnetic field in the feed path is sufficiently strong for creating MHD forces to eject a liquid metal from the discharge orifice 1214. Further, or instead, integrally forming the electrodes 1202 and the housing 1204 can reduce the number of interfaces between different materials, which can be difficult at high temperatures associated with the ejection of certain types of liquid metals.

Because the electrodes 1202 and a portion of the housing 1204 are integrally formed, a firing chamber 1218 formed by the electrodes 1202 can be substantially adjacent to the discharge region 1212 and, in particular, substantially adjacent to the discharge orifice 1214. As described above, delivering electric current into the fluid chamber 1206 at a point substantially adjacent to the discharge region 1212 can facilitate forming a shorter fluid chamber 1206 which, in turn, can increase resonance frequency. Thus, integrally forming the electrodes 1202 with a portion of the housing 1204 can have certain benefits with respect to ejecting liquid metal droplets at higher frequencies. In general, in implementations in which the housing of a nozzle is formed of metal, matching the resistivity between the liquid metal and the housing can be critical for reducing the likelihood that electric current from the electrodes will flow around the liquid metal in the flow chamber. Thus, in the example of the nozzle 1200, it should be understood that the electrical resistivity of the metal of the housing 1204 is advantageously substantially matched to the electrical resistivity of the liquid metal in the fluid chamber 1206. In implementations in which the electrodes 1202 and a portion of the housing 1204 are integrally formed, it should be further appreciated that the material forming the electrodes 1202 and the housing 1204 has a melting point greater than a melting point of the liquid metal to be ejected from the fluid chamber 1206. Thus, for example, in implementations in which the liquid metal is aluminum or an aluminum alloy, the material forming the electrodes 1202 and the housing 1204 can be tantalum or niobium, each of which has a melting point higher than aluminum or aluminum alloys, each of which has an electrical resistivity substantially similar to aluminum and its alloys, and each of which is weakly reactive with molten aluminum.

In instances in which at least a portion of the housing 1204 and the electrodes 1202 are integrally formed from metal, including the case in which there is a ceramic insert in the nozzle, the electric current can flow through the metal sidewalls defining the firing chamber 1218, as well as through the liquid metal flowing within the firing chamber 1218. In such instances, the portion of the current flowing through the metal sidewalls of the housing 1204 does not contribute to creating an MHD-derived pressure for ejection of the liquid metal. Accordingly, in certain implementations, it can be advantageous to make the sidewalls of the housing 1204 as thin as possible in a direction parallel to the magnetic field moving through the firing chamber 1206 (e.g., a magnetic field formed according to any one or more of the devices, systems, and methods described herein) to reduce the amount of electric current that can flow outside of the firing chamber 1218.

It can be further advantageous to match the electrical resistivity of the liquid metal and the portions of the electrodes 1202 and the housing 1204 defining the firing chamber matched as closely as possible. In an ideal case, in which these electrical resistivities are ideally matched, the electric current will flow uniformly through the firing chamber 1218, regardless of the shape of the firing chamber 1218. For example, if the fluid chamber 1206 and the firing chamber 1218 are cylindrical (e.g., as might be useful for facilitating manufacturing of the nozzle 1200), the electric current will flow in a direction perpendicular to the axis of the cylindrical shape. If, however, the electrical resistivity of the material of the electrodes 1202 and the housing 1204 defining the fluid chamber 1206 and the firing chamber 1218 is higher than the electrical resistivity of the liquid metal, the electric current will tend to crowd toward the center of the firing chamber 1218 as the electric current traverses the firing chamber 1218, which can reduce the effectiveness of MHD for ejecting the liquid metal by allowing for some of the energy to be dissipated as fluid eddies due to the non-uniform pumping action of the non-uniform current. To reduce the likelihood of such a reduction in the effectiveness of MHD, the cross-section of the firing chamber 1218 can be rectangular, rather than circular. Such a rectangular cross-section can be useful for reducing the impact of any mismatch in electrical resistivity between the liquid metal and the metal defining the firing chamber 1218 by providing that at least there is no difference in electrical resistance regardless of the path of the electric current between the electrodes 1202 through the firing chamber 1218.

In certain instances, the material forming electrodes compatible with liquid metal in a given nozzle can be expensive. In addition, or instead, the use of a combination of materials in the nozzle can be useful, for example, for making beneficial use of a combination of material properties (e.g., electrical resistivity, thermal conductivity, chemical reactivity, etc.). Thus, more generally, it can be useful to combine metals with other types of material in nozzles of the present disclosure.

Figure 13:
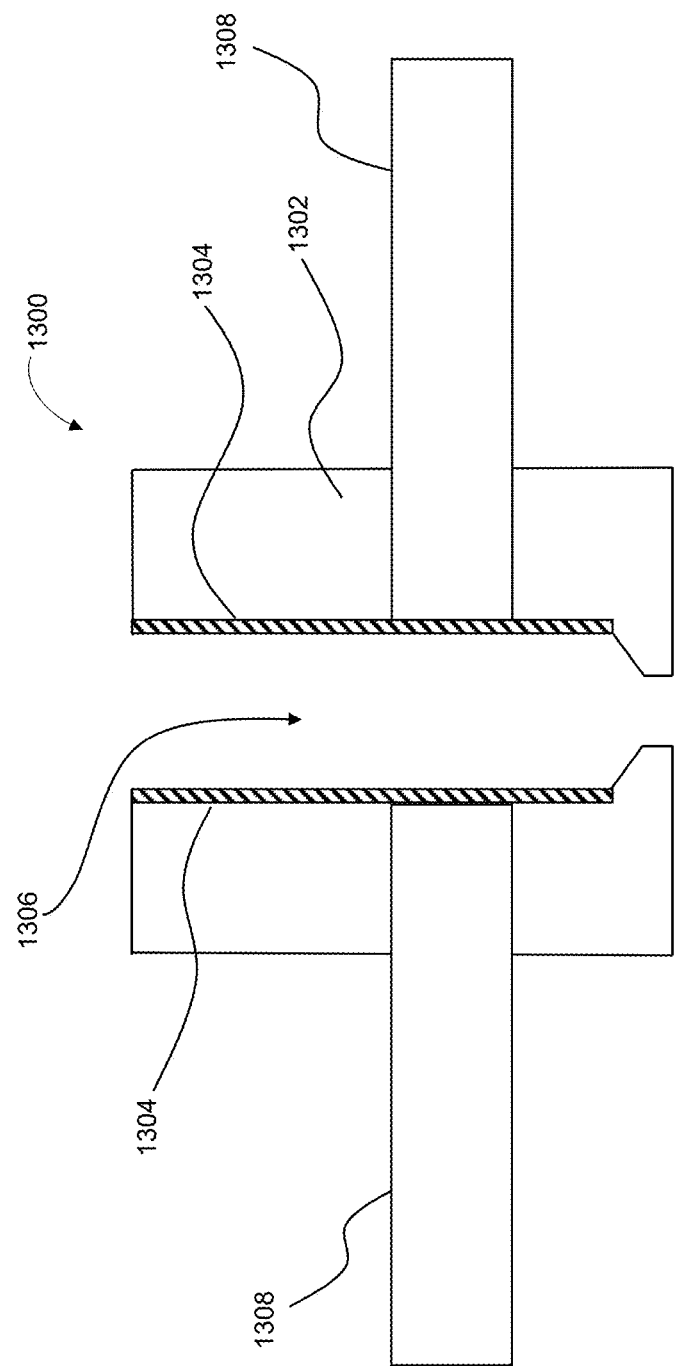
FIG. 13 is a cross-sectional side view of a nozzle including electrodes formed as a lining on a housing.

Returning to the example of the nozzle 1200, a portion of the discharge region 1212 defining a discharge orifice 1214 can be formed of a ceramic insert 1216 supported by the housing 1204 along the discharge region 1212. The ceramic insert 1216 can be formed of, for example, one or more of alumina, sapphire, ruby, aluminum nitride, aluminum carbide, silicon nitride, sialons, and boron carbide. The ceramic insert 1216 can be useful for withstanding wear as the liquid metal is ejected from the nozzle 1200. That is, in certain instances, the material of the ceramic insert 1216 can with stand wear better than the material defining the fluid chamber 1206, thus providing certain benefits with respect to prolonged use of the nozzle 1200. That is, the material of the housing 1204 and/or the electrodes 1202 can be formed of a metal that can be substantially inert with respect to the liquid metal in the fluid chamber 1206, but may not be inert enough for defining a discharge orifice because a large volume of liquid metal flowing past a discharge orifice at a high speed can magnify incomplete inertness of a metal. Accordingly, it the discharge orifice 1214 can be advantageously defined by the ceramic insert 1216. While the discharge orifice 1214 has been described as being defined by the ceramic insert 1216, it should be appreciated that, in certain instances, the ceramic insert 1216 can be omitted and the discharge orifice 1214 can be formed by the metallic material of the housing 1204. Referring now to FIG. 13, a nozzle 1300 can include a housing 1302 and a lining 1304 defining at least a portion of a fluid chamber 1306. The housing 1302 can be formed, for example, of a ceramic material. Examples of ceramic materials useful for forming the housing 1302 include one or more of titanium nitride, titanium aluminum nitride, titanium carbide, alumina, and titanium carbonitride. The metal material forming the lining 1304 is advantageously a metal compatible with a liquid metal to be ejected from the nozzle 1300 and, thus, for example, can be any of the various different electrode materials described herein. It should be appreciated that, as compared to electrodes integrally formed with a housing, the lining 1304 can be formed using less of a given material. Using less of the metal material can be particularly advantageous in instances in which the material forming the lining 1304 is expensive. For example, electrodes 1308 can be coupled to the lining 1304 to deliver electric current to the lining 1304 and, in certain instances, the electrodes 1308 can be formed of a less expensive material than the material forming the lining 1304.

In certain implementations, the electrodes 1304 can be plated onto the material of the housing 1302. For example, the electrodes 1304 can be plated along all or a portion of the housing 1302 (e.g., along all or a portion of the fluid chamber 1306). Further, or instead, the electrodes 1304 can be applied to the housing 1302 through any one or more metal deposition techniques known in the art.

Figure 14:
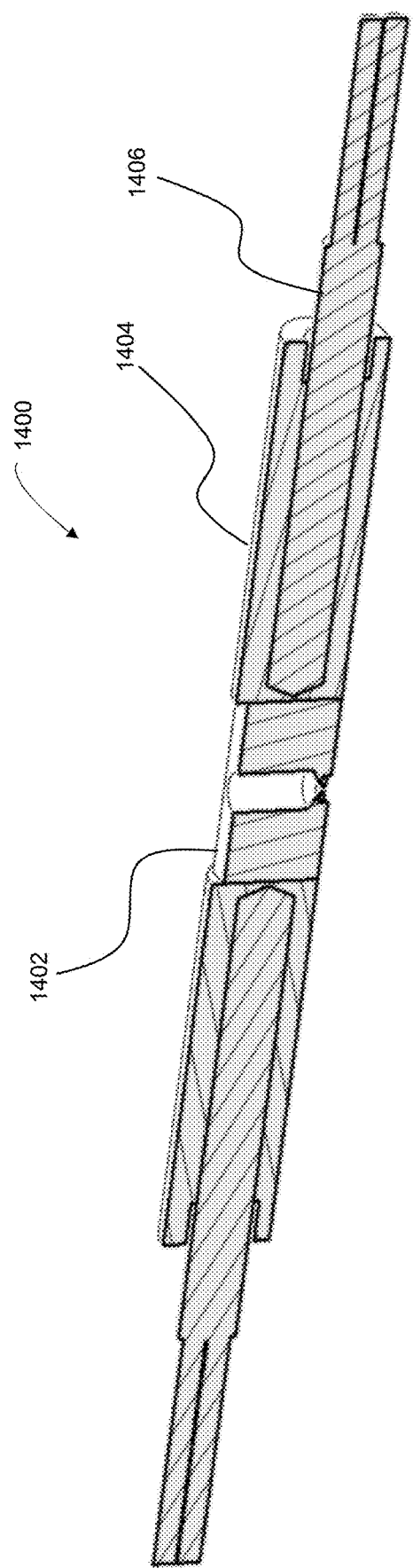
FIG. 14 is a cross-sectional isometric view of a nozzle including a housing and a nozzle formed of a combination of materials.

Referring now to FIG. 14, a nozzle 1400 can include an electrode section 1402 and a housing section 1404. In general, the electrode section 1402 and the housing section 1404 can be formed of different materials (e.g., different metals). As a specific example, the electrode section 1402 can be formed of a first material satisfying requirements of relative inertness and thermal stability in contact with a liquid metal to be ejected. Depending on the liquid metal to be ejected, the choice of the first material satisfying these requirements may be relatively expensive. For example, tantalum is suitable for use as the first material in instances in which the liquid metal is aluminum or an aluminum alloy. However, tantalum is expensive, relative to other types of metals. Thus, more generally, it can be desirable to form the electrode section 1402 as a small piece of the first material suitable for contact with the liquid metal and, additionally or alternatively, to form the housing section 1404 as a larger piece (e.g., for supporting ancillary components associated with the nozzle 1400, such as a cartridge heater 1406). The second material of the housing section 1404 can be formed of a material satisfying thermal stability at the temperature of the liquid metal. However, because the housing section 1404 is not in contact with the liquid metal, the materials suitable for the second material can be less expensive those materials suitable for the first material. Returning to the example of the first material of the electrode section 1402 being formed of tantalum, the second material of the housing section 1404 can be formed of, for example, copper. In general, the electrode section 1402 and the housing section 1404 can be joined to one another through welding and brazing techniques known in the art.

Figure 15:
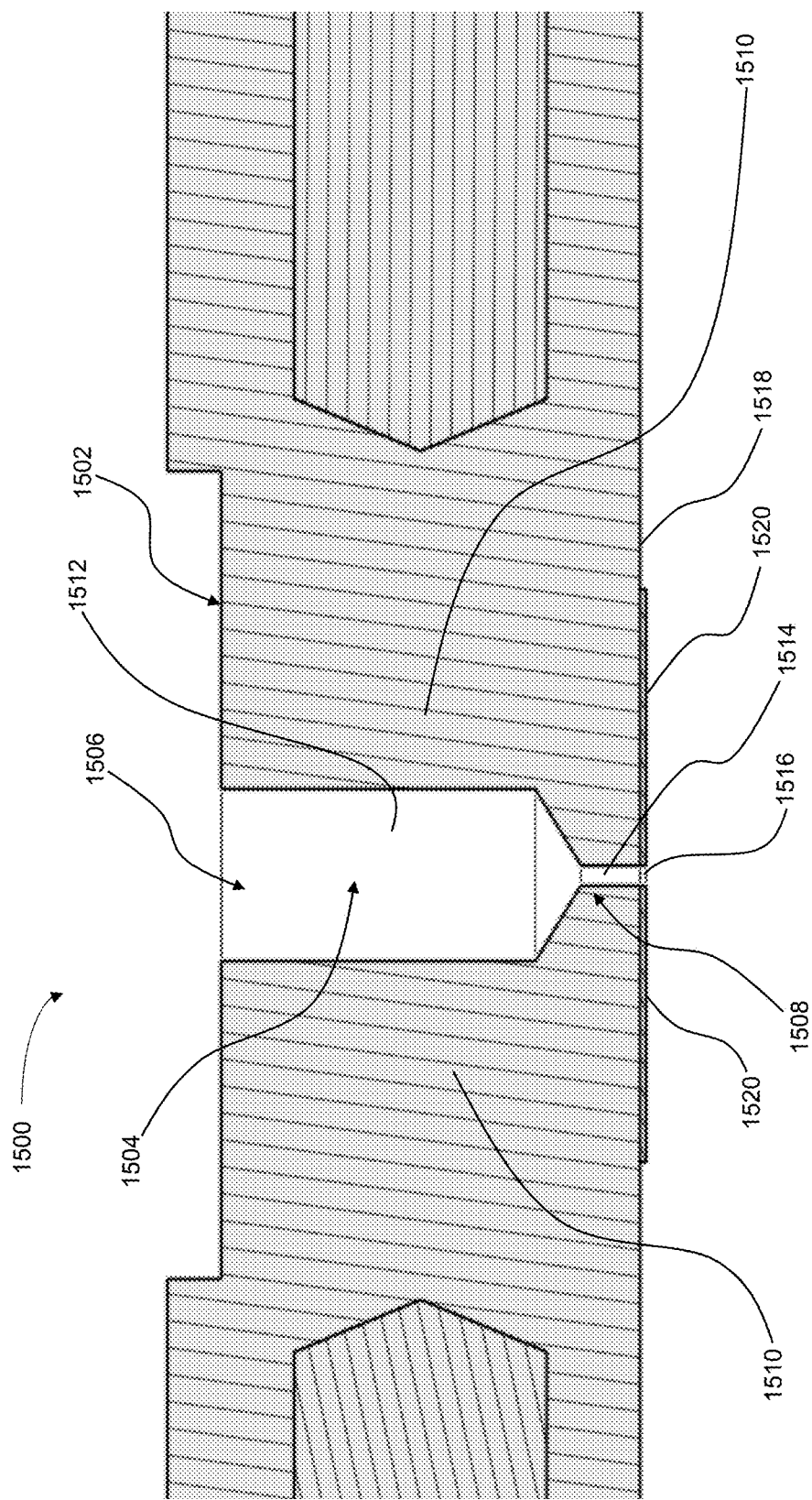
FIG. 15 is a cross-sectional side view of a nozzle include a non-wetting film on an outer surface of a housing.

Referring now to FIG. 15, a nozzle 1500 can include a housing 1502 defining at least a portion of a fluid chamber 1504 extending between an inlet region 1506 and a discharge region 1508. Electrodes 1510 define at least a portion of a firing chamber 1512 within the fluid chamber 1504 between the inlet region 1506 and the discharge region 1508. In certain instances, the nozzle 1500 can be an all-metal construction such that the housing 1502 and the electrodes 1510 are formed of metal (e.g., the same metal, such as part of an integral structure). The discharge region 1508 can have a throat 1514 and a discharge orifice 1516 in fluid communication with the throat 1514 and the fluid chamber 1504 such that, in use, liquid metal moves from the fluid chamber 1504 through the discharge orifice 1516, via the throat 1514. The discharge orifice 1516 can be defined, for example, by an outer surface 1518 of the housing 1502. The throat 1514 can be, for example, substantially cylindrical, and a diameter of the throat 1514 can be substantially equal to the diameter of the discharge orifice 1516.

In use, the discharge orifice 1516 can be wetted with a liquid metal disposed in the fluid chamber 1504. Such wetting at the discharge orifice 1516 can improve control over ejection of the liquid metal from the discharge orifice. However, in certain instances, wetting the discharge orifice 1516 in this way can increase the risk of the liquid metal inadvertently extending beyond the discharge orifice (e.g., along the outer surface 1518 of the housing 1502), which itself can interfere with control over ejection of the liquid metal. For example, liquid metal wetted along the outer surface 1518 of the housing can adhere to liquid metal droplets being ejected from the discharge orifice 1516 and, thus, produce larger droplets than intended. Accordingly, the nozzle 1500 can further, or instead, include a film 1520 along the outer surface of the housing 1502 (e.g., along a portion of the outer surface of the housing 1502 defining the discharge orifice 1516). The film 1520 can be useful, for example, for limiting wetting of the liquid metal to desired surfaces in the discharge region 1516.

The film 1520 can be substantially non-wetting (e.g., having a wetting angle of greater than about 90 degrees) with respect to a liquid metal stably supportable along the firing chamber 1512 at least partially defined by the electrodes 1510. As used herein, a liquid metal stably supportable in the firing chamber 1512 should be understood to include a liquid metal supportable along the firing chamber 1512 without altering the electrodes 1510 to a degree resulting in significant degradation in the delivery of electric current into the firing chamber 1512. By way of non-limiting example, in instances in which a molten form of aluminum, an aluminum alloy, or solder is supported in the fluid chamber 1504 for ejection through the discharge orifice 1516, the film 1520 can be substantially non-wetting with respect to the molten form of aluminum, aluminum alloy, or solder and the electrodes 1510 can have a melt temperature greater than a melt temperature of the aluminum, aluminum alloy, or solder and remain substantially chemically inert with respect to the aluminum, aluminum alloy, or solder. Thus, more generally, the selection of a material of the film 1520 can be related to the selection of a material of the electrodes 1510 at least because each material must have certain properties in the presence of the liquid metal for proper operation of the nozzle 1400 with respect to ejection of the liquid metal (e.g., for imparting an MHD force in the firing chamber to eject the liquid metal through the discharge orifice 1516 without significantly wetting the outer surface 1518 of the housing 1502).

In certain implementations, the throat 1514 can be wettable with respect to the liquid metal stably supportable in the firing chamber. Thus, the liquid metal stably supportable in the firing chamber 1504 can have a greater contact angle with the film 1520 than the material of the housing 1502 defining the throat 1514. As an example, the film can include an oxide of at least a component of a material forming the portion of the housing 1502 defining the throat. Thus, for example, in instances in which the housing is formed of tantalum, the film can include tantalum oxide. As another example, in instances in which the housing is formed of steel, the film can include chromium oxide or oxides of other components of steel.

In use, therefore, the liquid metal can wet the throat 1514 (e.g., as electric current is pulsed through the firing chamber 1504 according to any one or more of the methods described herein) while the film 1520 remains non-wetted. Wetting the throat 1514 can be useful, for example, for accurately jetting droplets of the liquid metal at high speeds. For example, wetting the throat 1514 can reduce the likelihood that an environmental gas (e.g., air, nitrogen, argon, etc.), which can interfere with droplet formation, will be present in the throat 1514 as the liquid metal is driven through the throat 1514 during ejection of droplets of the liquid metal. Thus, in general, wetting the throat 1514 can facilitate pulsing electric current at higher frequencies, which can facilitate a more rapid rate of droplet ejection from the nozzle 1400, as compared to a nozzle in which liquid metal is not wetted in the throat.

The film 1520 can be supported on the outer surface of the housing 1502 through any of various different methods. In certain instances, the film can be a separate material applied to the outer surface of the housing 1502. Additionally, or alternatively, the film 1520 can be integrally formed with the outer surface 1518 of the housing 1502. Such integral formation of the film 1520 and the housing 1502 can be useful for reducing the likelihood of separation between the film 1520 and the housing 1502 during operation. Further, or instead, the film 1520 can be grown on the outer surface 1518 of the housing 1502 by oxidizing the material of the outer surface 1518 of the housing 1502 (e.g., by oxidizing tantalum or steel). Still further or instead, the film 1520 can be deposited on the outer surface 1518 of the housing 1502 through chemical vapor deposition (CVD), physical vapor deposition (PVD) and other methods known in the art.

Figure 16:
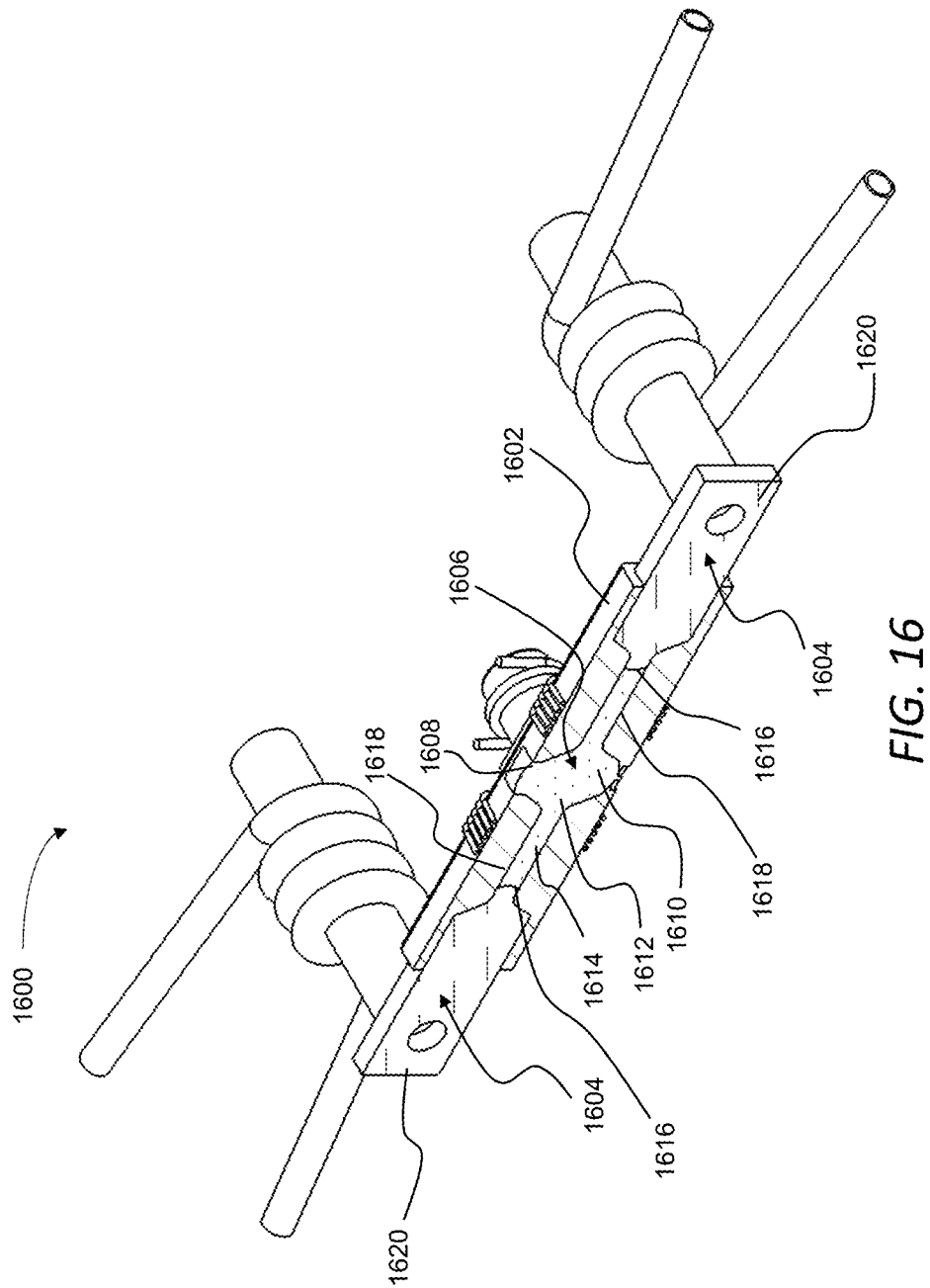
FIG. 16 is a cross-sectional isometric view of a nozzle including neck regions.

As another example, while temperature gradients have been described as being formed in electrodes through various different forms of cooling, other implementations are additionally or alternatively possible. For example, referring now to FIG. 16, a nozzle 1600 can include a housing 1602 and electrodes 1604. The housing 1602 can define at least a portion of a fluid chamber 1606 having an inlet region 1608 and a discharge region 1610. The electrodes 1604 can define at least a portion of a firing chamber 1612 within the fluid chamber 1606. In use, a liquid metal 1614 is disposed in the fluid chamber 1504. In general, the material of the electrodes 1604 in contact with the liquid metal 1614 can be formed of the same or substantially the same material and, thus, more specifically, interfaces 1616 between the liquid metal 1614 and the electrodes 1604 can be a molten form of the material. In general, operation of the nozzle 1600 can be similar to operation of the nozzle 102 described above with respect to FIGS. 1 and 2A-D, unless otherwise indicated or made clear from the context.

The housing 1602 can define neck regions 1618 between respective external portions 1620 of the electrodes 1604 and the firing chamber 1612. In particular, the neck regions 1616 can have a reduced cross-sectional area, as compared to the firing chamber 1612 and each of the external portions 1620 of the electrodes 1604. In certain instances, thermal conductivity of the material of the electrodes 1604 can be significantly higher than that of the material forming the housing 1602 (e.g., in instances in which the electrodes 1604 are formed of metal and the housing 1602 is formed of a ceramic material). In such instances, the reduced cross-sectional area of the electrodes 1604 along the neck regions 1618 of the housing can facilitate establishing a substantial temperature gradient along each respective electrode 1604. Such a substantial temperature gradient can be useful, for example, for controlling the position of the respective interface 1616 between each electrode 1604 and the liquid metal 1614. Additionally, or alternatively, the reduced cross-sectional area of the electrodes 1604 can facilitate reducing the opportunity for fluid eddies to form within the firing chamber 1612 due to the possibility of non-uniform magnetic field or non-uniform current flow in the area.

Figure 17:
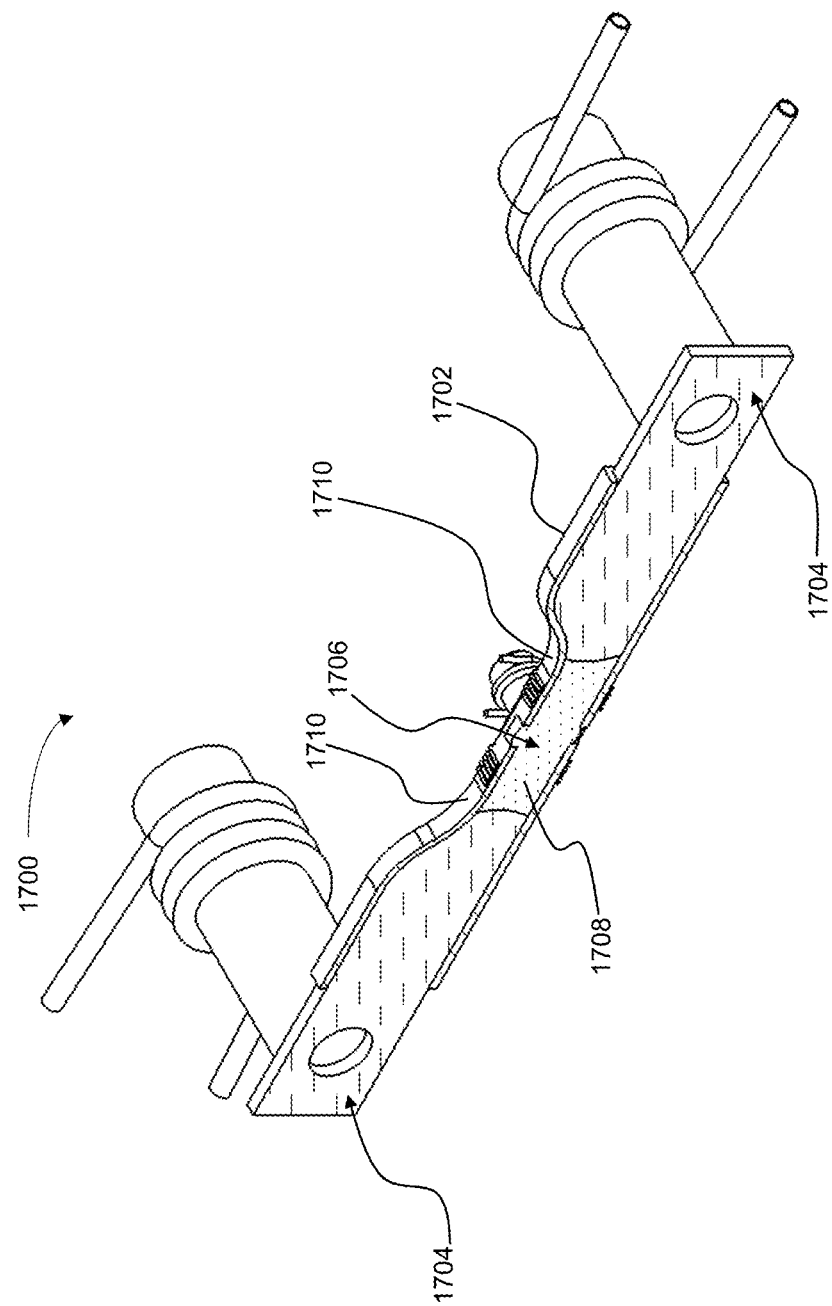
FIG. 17 is a cross-sectional isometric view of a nozzle including neck regions, with a cross-section of the housing following the neck regions.

Referring now to FIG. 17, a nozzle 1700 can include a housing 1702 and electrodes 1704. The housing 1702 can define at least a portion of a fluid chamber 1706, and the electrodes 1704 can define at least a portion of a firing chamber 1708 within the fluid chamber 1706. The housing 1702 can include neck regions 1710 having a reduced cross-sectional area. The reduced cross-sectional area of the neck regions 1710 can extend through the firing chamber 1708. The cross-sectional area of the housing 1702 can follow the cross-section of the electrodes 1704, including, for example, along the neck regions 1710. As compared to the nozzle 1600 in FIG. 16, it should be appreciated that the nozzle 1700 can facilitate formation of a fluid chamber 1706 having a shorter length, which can advantageously increase resonant frequency associated with fluid chamber 1706. Thus, more generally, the nozzle 1700 can facilitate forming shorter fluid chambers and, therefore, can facilitate ejection of liquid metal at higher frequencies without exciting a resonance frequency.

Figure 18:
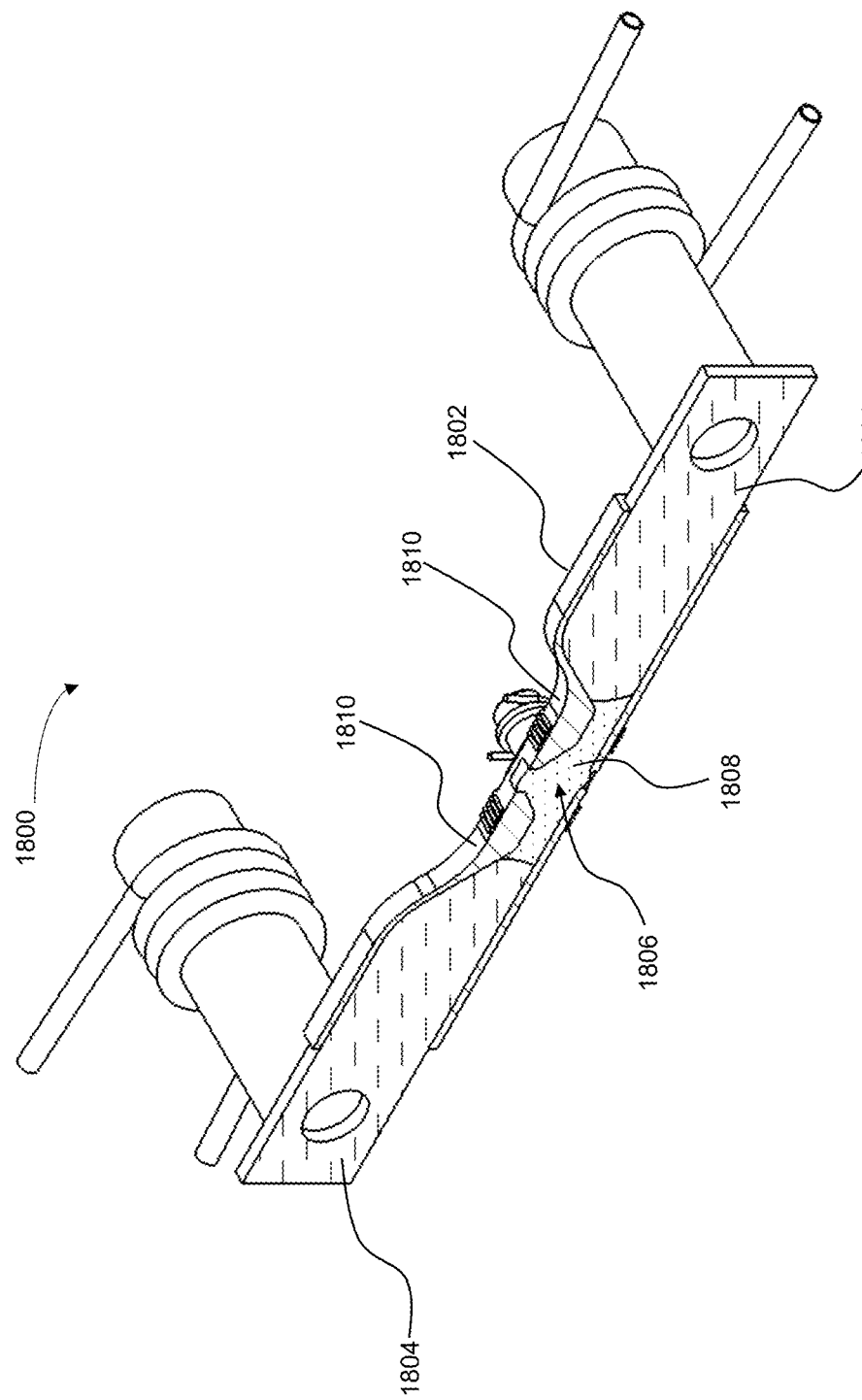
FIG. 18 is a cross-sectional isometric view of a nozzle including neck regions, with portions of the nozzle having different heights.

Referring now to FIG. 18, a nozzle 1800 can include a housing 1802 and electrodes 1804. The housing 1802 can define at least a portion of a fluid chamber 1806, and the electrodes 1804 can define at least a portion of a firing chamber 1808 within the fluid chamber 1806. The housing 1802 can include neck portions 1810. The respective maximum heights of the electrodes 1804, the neck portions 1810, and the firing chamber 1808 can each differ from one another.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. Absent an explicit indication to the contrary, the disclosed steps may be modified, supplemented, omitted, and/or re-ordered without departing from the scope of this disclosure. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of additive manufacturing, the method comprising:
    providing a liquid metal in a fluid chamber at least partially defined by a housing, the fluid chamber having an inlet region and a discharge region;
    directing a magnetic field through the housing;
    moving the discharge region in a controlled three-dimensional pattern; and
    delivering electric current between electrodes at least partially defining a firing chamber within the fluid chamber between the inlet region and the discharge region, the electric current intersecting the magnetic field in the liquid metal in the firing chamber to eject the liquid metal from the discharge region; and
    changing a velocity of the liquid metal ejected from the discharge region therein controlling porosity of one or more predetermined portions of an accumulation of the ejected liquid metal on a build plate or on a previously deposited layer of metal.

2. The method of claim 1, wherein controlling porosity of the one or more predetermined portions of the accumulation of the ejected liquid metal includes forming an interface between a support structure and a three-dimensional object in the accumulation, the support structure and the three-dimensional object having lower porosity than the interface.

3. The method of claim 2, wherein the interface, the support structure and the three-dimensional object are formed of the same material.

4. The method of claim 2, wherein the interface is frangible relative to the three-dimensional object.

5. The method of claim 4, further comprising separating the three-dimensional object from the support structure through application of one or more of a compressive force and a shear force to the interface.

6. The method of claim 1 wherein changing the velocity of the liquid metal ejected from the discharge region includes changing a magnitude of the electric current delivered into the liquid metal in the firing chamber.

7. The method of claim 1, wherein delivering electric current into the liquid metal in the firing chamber includes pulsing the electric current.

8. The method of claim 1, wherein changing the velocity of the liquid metal ejected from the discharge region includes changing at least one of a magnitude and a duration of a pulse of the electric current.

9. A method of additive manufacturing, the method comprising:
    providing a liquid metal in a fluid chamber at least partially defined by a housing, the fluid chamber having an inlet region and a discharge region;
    directing a magnetic field through the housing;
    moving the discharge region in a controlled three-dimensional pattern; and
    delivering electric current between electrodes at least partially defining a firing chamber within the fluid chamber between the inlet region and the discharge region, the electric current intersecting the magnetic field in the liquid metal in the firing chamber to eject the liquid metal from the discharge region; and
    changing a temperature of the liquid metal ejected from the discharge region therein controlling porosity of one or more predetermined portions of an accumulation of the ejected liquid metal on a build plate or on a previously deposited layer of metal.

10. The method of claim 9, wherein changing the temperature of the liquid metal ejected from the discharge region includes reducing the temperature of the ejected liquid metal to increase porosity of a predetermined portion of the accumulation of the ejected liquid metal on the build plate or on the previously deposited layer of metal.

11. The method of claim 9, wherein controlling porosity of the one or more predetermined portions of the accumulation of the ejected liquid metal includes forming an interface between a support structure and a three-dimensional object in the accumulation, the support structure and the three-dimensional object having lower porosity than the interface.

12. The method of claim 11, wherein the interface, the support structure and the three-dimensional object are formed of the same material.

13. The method of claim 11, wherein the interface is frangible relative to the three-dimensional object.

14. The method of claim 13, further comprising separating the three-dimensional object from the support structure through application of one or more of a compressive force and a shear force to the interface.

15. The method of claim 9, wherein delivering electric current into the liquid metal in the firing chamber includes pulsing the electric current.

* * * * *